US012793737B2

(12) United States Patent
Iwashiro

(10) Patent No.: US 12,793,737 B2
(45) Date of Patent: Nov. 10, 2026

(54) CONTROL DEVICE, DISK DRIVE, CONTROL METHOD, AND STORAGE MEDIUM

(71) Applicants: Kabushiki Kaisha Toshiba, Kawasaki (JP); Toshiba Electronic Devices & Storage Corporation, Kawasaki (JP)

(72) Inventor: Masafumi Iwashiro, Yokohama Kanagawa (JP)

(73) Assignees: KABUSHIKI KAISHA TOSHIBA, Kawasaki (JP); TOSHIBA ELECTRONIC DEVICES & STORAGE CORPORATION, Kawasaki (JP)

( * ) Notice: Subject to any disclaimer, the term of this patent is extended or adjusted under 35 U.S.C. 154(b) by 0 days.

(21) Appl. No.: 19/372,098

(22) Filed: Oct. 28, 2025

(65) Prior Publication Data

US 2026/0245587 A1 Aug. 20, 2026

(30) Foreign Application Priority Data

Feb. 18, 2025 (JP) ................................ 2025-023987

(51) Int. Cl.
*G11B 21/08* (2006.01)
*G11B 5/596* (2006.01)
(Continued)

(52) U.S. Cl.
CPC .......... *G11B 21/08* (2013.01); *G11B 5/59627* (2013.01); *G11B 19/06* (2013.01); *G11B 19/20* (2013.01); *G11B 21/02* (2013.01)

(58) Field of Classification Search
None
See application file for complete search history.

(56) References Cited

U.S. PATENT DOCUMENTS 5,481,733 A 1/1996 Douglis et al.
5,801,505 A * 9/1998 Lee ........................ G11B 19/20 318/809

(Continued)

FOREIGN PATENT DOCUMENTS

JP 2001-148173 A 5/2001
JP 2023-142313 A 10/2023
JP 2025-133600 A 9/2025

*Primary Examiner* — Peter Vincent Agustin
(74) *Attorney, Agent, or Firm* — Knobbe, Martens, Olson & Bear, LLP

(57) ABSTRACT

A control device can perform a first determination process. A processor of the control device can perform a first calculation process which is performed to control a position of a head of a disk drive, a second calculation process, and an alternative process which is performed to hold the position of the head at a predetermined position with a calculation load smaller than that of the first calculation process. The first determination process includes acquiring a first execution time and a second execution time. The first determination process includes selecting a second execution method different from a first execution method of performing the second calculation process while performing the first calculation process when the second execution time is less than the first execution time. The second execution method is a method of starting the alternative process instead of the first calculation process and then performing the second calculation process.

17 Claims, 12 Drawing Sheets

(51) Int. Cl.

| | |
|---|---|
| ***G11B 19/06*** | (2006.01) |
| ***G11B 19/20*** | (2006.01) |
| ***G11B 21/02*** | (2006.01) |

(56) References Cited

U.S. PATENT DOCUMENTS

| | | | | |
|---|---|---|---|---|
| 5,880,902 | A | 3/1999 | Yu et al. | |
| 5,914,581 | A * | 6/1999 | Suzuki | G11B 19/00 318/78 |
| 6,639,750 | B1 | 10/2003 | Hirano et al. | |
| 11,948,600 | B2 | 4/2024 | Uehara | |
| 11,996,127 | B2 | 5/2024 | Iwashiro | |
| 2001/0006438 | A1 * | 7/2001 | Nakagawa | G11B 5/59627 360/78.09 |
| 2002/0003676 | A1 * | 1/2002 | Tokizono | G11B 19/04 |
| 2003/0206365 | A1 * | 11/2003 | Ho | G11B 5/59622 360/77.02 |
| 2005/0180042 | A1 * | 8/2005 | Baek | G11B 5/59627 360/77.02 |
| 2007/0064025 | A1 * | 3/2007 | Haga | G06F 3/061 |
| 2015/0055243 | A1 * | 2/2015 | Ehrlich | G11B 19/2072 360/69 |
| 2017/0186454 | A1 * | 6/2017 | Asakura | G11B 5/59627 |
| 2023/0307001 | A1 | 9/2023 | Iwashiro | |
| 2024/0087602 | A1 | 3/2024 | Iwashiro | |
| 2025/0279117 | A1 | 9/2025 | Yamamoto et al. | |

* cited by examiner

CONTROL DEVICE, DISK DRIVE, CONTROL METHOD, AND STORAGE MEDIUM

CROSS-REFERENCE TO RELATED APPLICATION

This application is based upon and claims the benefit of priority from Japanese Patent Application No. 2025-023987, filed on Feb. 18, 2025; the entire contents of which are incorporated herein by reference.

FIELD

An embodiment of the present invention relates to a control device, a disk drive, a control method, and a storage medium.

BACKGROUND

A processing device that performs a predetermined calculation process may perform another calculation process while performing the predetermined calculation process using a processor. In this case, since a part of the processing capability of the processor is used in the predetermined calculation process, a time required until the other calculation process is completed may be increased. For example, in a disk drive, the processor may perform another calculation process which is performed to improve the throughput of the disk drive along with a predetermined calculation process which is performed to control a position of a head. In this case, a time required for the other calculation process performed to improve the throughput of the disk drive may be increased, and a time required until the throughput of the disk drive is improved may be increased.

DETAILED DESCRIPTION

Figure 1:
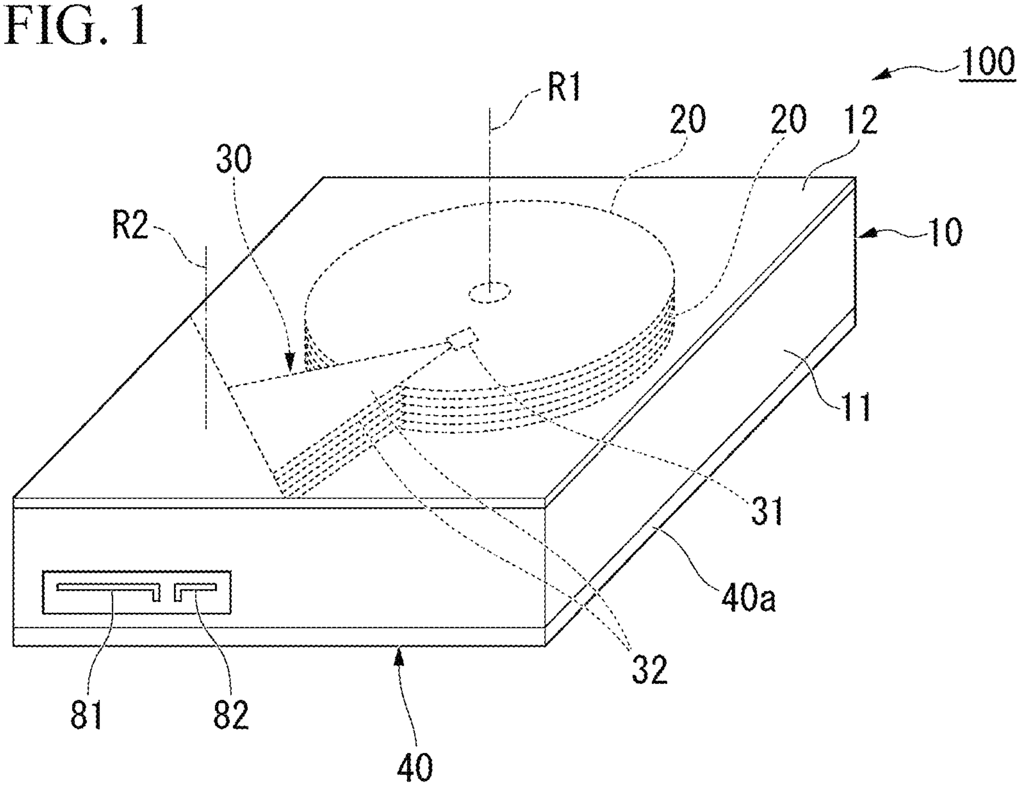
FIG. 1 is a perspective view illustrating a disk drive according to an embodiment.

A control device according to an embodiment is a control device that controls a disk drive. The control device includes a processor. The control device is configured to perform a first determination process. The processor is configured to perform a first calculation process which is performed to control a position of a head of the disk drive. The processor is configured to perform a second calculation process which is able to be performed at the same time as the first calculation process. The processor is configured to perform an alternative process which is performed to hold the position of the head at a predetermined position with a calculation load smaller than that of the first calculation process. The first determination process is a process which is performed on the basis of information stored in a predetermined storage medium when it is determined that the second calculation process is to be performed. The information stored in the storage medium includes a first processing time which is required until the second calculation process is completed when the processor performs only the second calculation process. The information stored in the storage medium includes a second processing time which is required until the position of the head is held at the predetermined position through the alternative process instead of the first calculation process. The information stored in the storage medium includes a third processing time which is required to restart the first calculation process which has been stopped by performing the alternative process. The information stored in the storage medium includes a first process occupancy ratio of the processor which is required to perform the first calculation process. The information stored in the storage medium includes a second process occupancy ratio of the processor which is required to hold the position of the head through the alternative process. The first determination process includes acquiring a first execution time expressed by $TA/(1-k1)$ and a second execution time expressed by $\{TA/(1-k2)\}+TB+TC$ on the basis of the information stored in the storage medium where the first processing time is defined as TA, the second processing time is defined as TB, the third processing time is defined as TC, the first process occupancy ratio is defined as k1, and the second process occupancy ratio is defined as k2. The first determination process includes selecting a second execution method different from a first execution method of performing the second calculation process while performing the first calculation process as a method of performing the second calculation process when the second execution time is less than the first execution time. The second execution method is a method of starting the alternative process instead of the first calculation process and then performing the second calculation process.

Hereinafter, a control device, a disk drive, a control method, and a storage medium according to an embodiment will be described with reference to the accompanying drawings.

Figure 2:
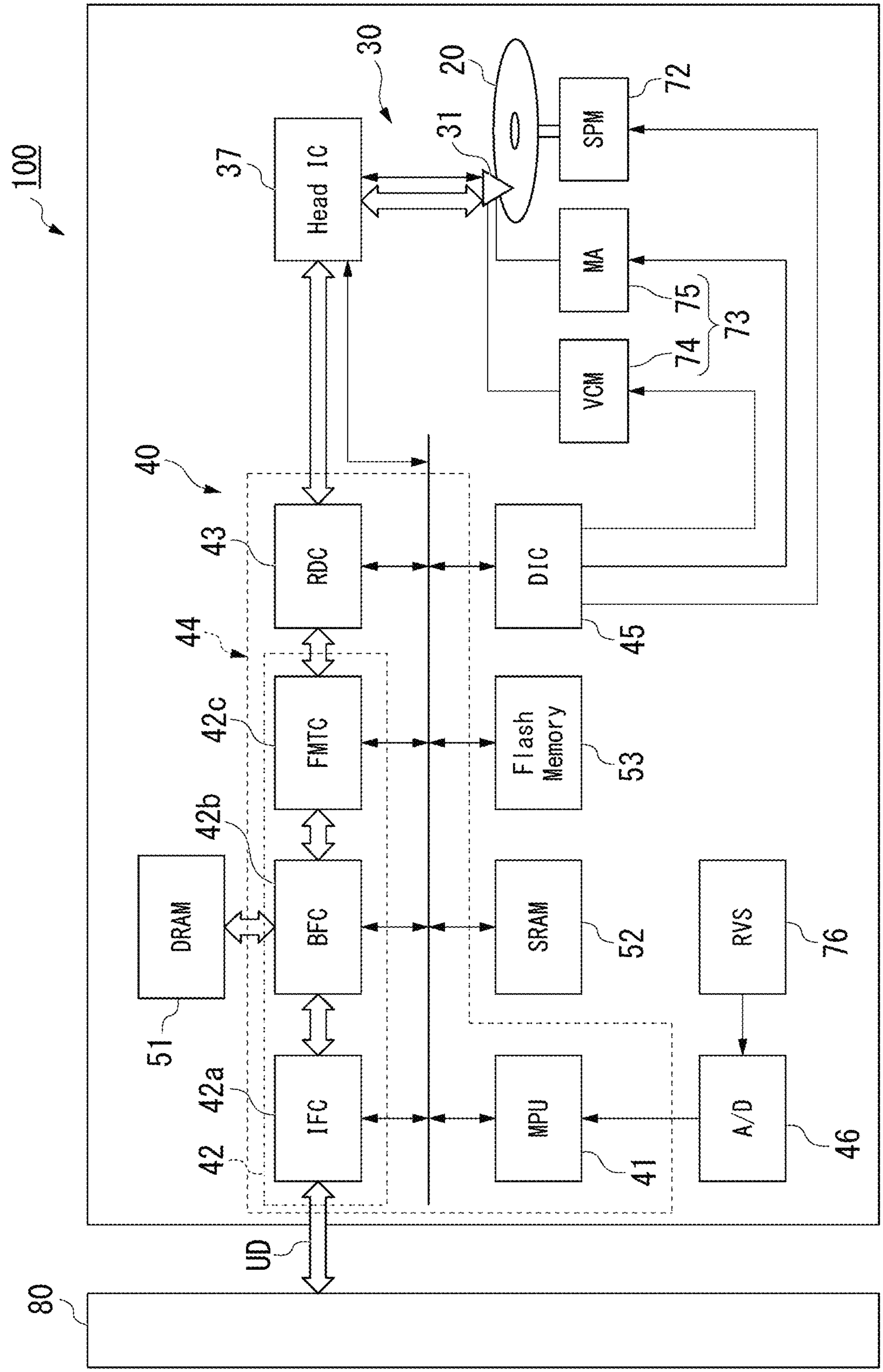
FIG. 2 is a block diagram illustrating a configuration of the disk drive according to the embodiment.
Figure 3:
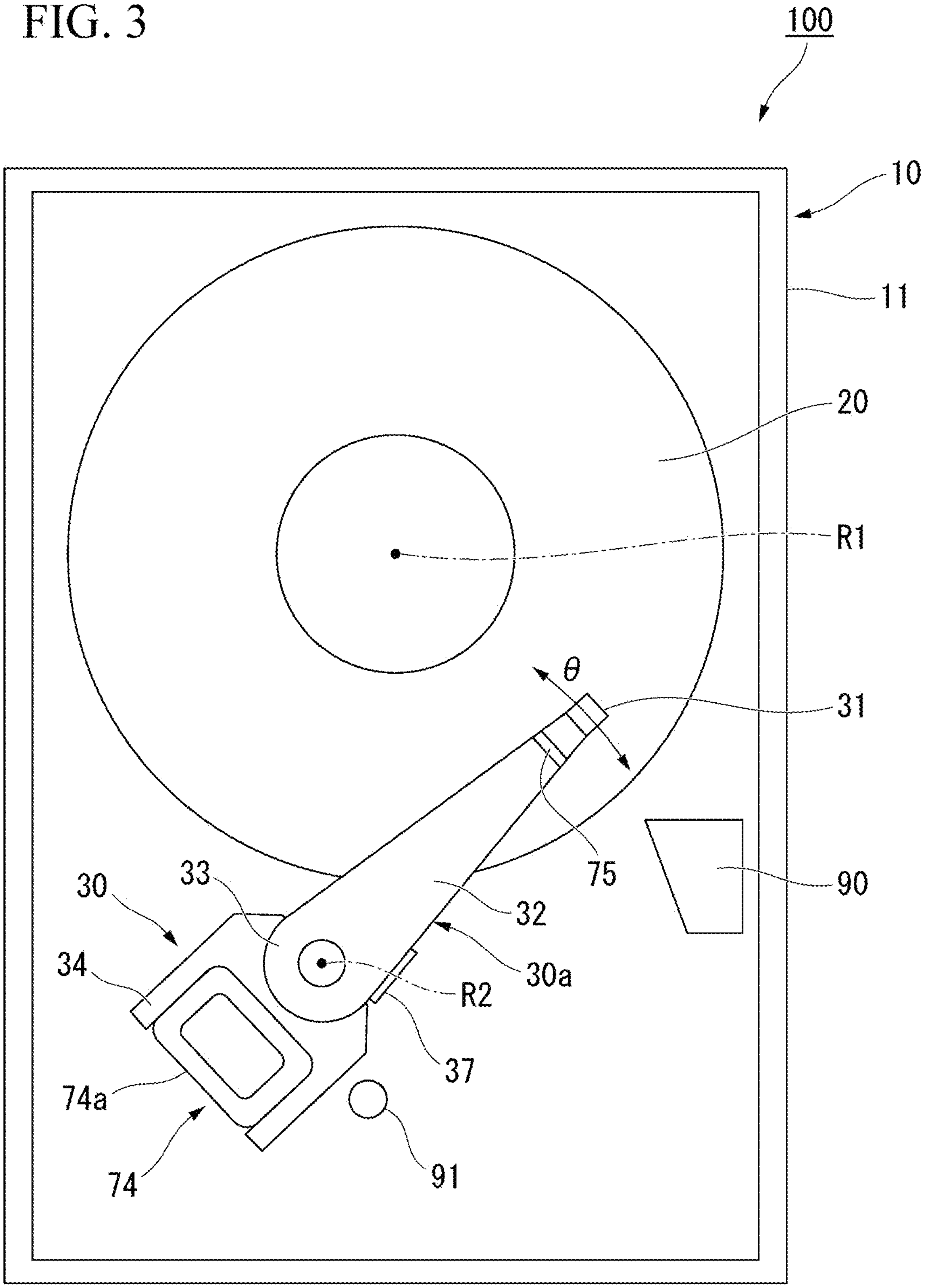
FIG. 3 is a diagram illustrating a part of the disk drive according to the embodiment.

FIG. 1 is a perspective view illustrating a disk drive 100 according to an embodiment. FIG. 2 is a block diagram illustrating a configuration of the disk drive 100 according to the present embodiment. FIG. 3 is a diagram illustrating a part of the disk drive 100 according to the present embodiment. The disk drive 100 according to the present embodiment illustrated in FIGS. 1 to 3 is a magnetic disk drive in which a hard disk drive is incorporated. The disk drive 100 can store information as digital data. The disk drive 100 is driven on the basis of an instruction from a host device 80. The host device 80 is, for example, a server or a personal computer. The host device 80 is not particularly limited as long as it is a device that gives an instruction to the disk drive 100. The host device 80 can write information to the disk drive 100 and read data stored in the disk drive 100.

As illustrated in FIG. 1, the disk drive 100 includes a case 10, a disk 20, a head assembly 30, a control device 40, a power supply terminal 81, and a connection terminal 82. As illustrated in FIG. 2, the disk drive 100 includes a spindle motor 72, an actuator 73, and a vibration sensor 76. As illustrated in FIG. 3, the disk drive 100 includes a lock mechanism 90 and a stopper 91.

As illustrated in FIG. 1, the case 10 accommodates the disk 20 and the head assembly 30 therein. The case 10 includes a case body 11 and a lid member 12. As illustrated in FIG. 3, the disk 20, the head assembly 30, the lock mechanism 90, and the stopper 91 are accommodated in the case body 11.

In the present embodiment, the disk 20 is a magnetic disk. The disk 20 has a circulate plate shape. The disk 20 is rotated about a first rotation axis R1 by the spindle motor 72. The disk 20 includes a recording surface on which digital data is recorded. As illustrated in FIG. 1, a plurality of disks 20 are arranged at intervals in an axial direction of the first rotation axis R1. The number of disks 20 is not particularly limited as long as it is equal to or greater than one.

The head assembly 30 illustrated in FIG. 3 is electrically connected to the control device 40. The head assembly 30 is controlled by the control device 40 and performs writing data to the disk 20 and reading data stored in the disk 20. The head assembly 30 is a head stack assembly that is provided in the disk drive 100. The head assembly 30 is rotated about a second rotation axis R2 by a voice coil motor 74 of the actuator 73 which will be described later. The second rotation axis R2 extends in the axial direction of the first rotation axis R1. The second rotation axis R2 is parallel to the first rotation axis R1.

The head assembly 30 includes a body 30*a*, a plurality of heads 31, and a head amplifier IC 37. Although not illustrated, the head amplifier IC 37 includes a read amplifier and a write driver. The read amplifier amplifies a signal of data read from the disk 20 by the head 31 and outputs the amplified signal to a read/write channel 43 in a controller 44. The write driver outputs a write current corresponding to data output from the read/write channel 43 to the head 31. The head 31 writes data to the disk 20 on the basis of the write current output from the write driver. The head amplifier IC 37 is mounted on a flexible board which is not illustrated. The flexible board is electrically connected to the head 31 to the control device 40.

The body 30*a* includes a base 33, a plurality of arms 32, and a holding unit 34. The head amplifier IC 37 is attached to the base 33 via a flexible board which is not illustrated. The plurality of arms 32 extend in a radial direction centered on the second rotation axis R2 from the base 33. As illustrated in FIG. 1, the plurality of arms 32 are arranged in parallel at intervals in the axial direction of the first rotation axis R1. The heads 31 are attached to the tips of the plurality of arms 32. As illustrated in FIG. 3, the holding unit 34 is formed in the base 33. A coil 74*a* of a voice coil motor 74 is held by the holding unit 34.

Each head 31 is a magnetic head that can read data stored in the corresponding disk 20 and write data to the corresponding disk 20. The head 31 can perform reading of data from the recording surface of the disk 20 and writing of data to the recording surface of the disk 20 at a position facing the recording surface of the disk 20. By causing the voice coil motor 74 which will be described later to rotate the head assembly 30 about the second rotation axis R2, each head 31 attached to the tip of the corresponding arm 32 moves to a position facing the recording surface of the corresponding disk 20 and a position not facing the recording surface of the disk 20.

The actuator 73 is an actuator for moving the heads 31. As illustrated in FIG. 2, the actuator 73 according to the present embodiment includes a voice coil motor 74 and microactuators 75. A position θ of the head 31 in a circumferential direction about the second rotation axis R2 is controlled by the voice coil motor 74 and the microactuators 75. The voice coil motor 74 rotates the head assembly 30 about the second rotation axis R2. As illustrated in FIG. 3, the microactuators 75 are attached to tip portions of the plurality of arms 32. Each microactuator 75 moves the corresponding head 31 minutely in the circumferential direction of the second rotation axis R2. Each microactuator 75 is, for example, an actuator that moves the corresponding head 31 using two piezoelectric elements. The microactuators 75 may be an actuator having any structure as long as it can move the head 31. In the present embodiment, the position θ of each head 31 in the circumferential direction about the second rotation axis R2 is controlled by the voice coil motor 74 and the microactuators 75. The actuator 73 may not include the microactuators 75. The actuator 73 may have any configuration as long as it can move the head 31.

Figure 4:
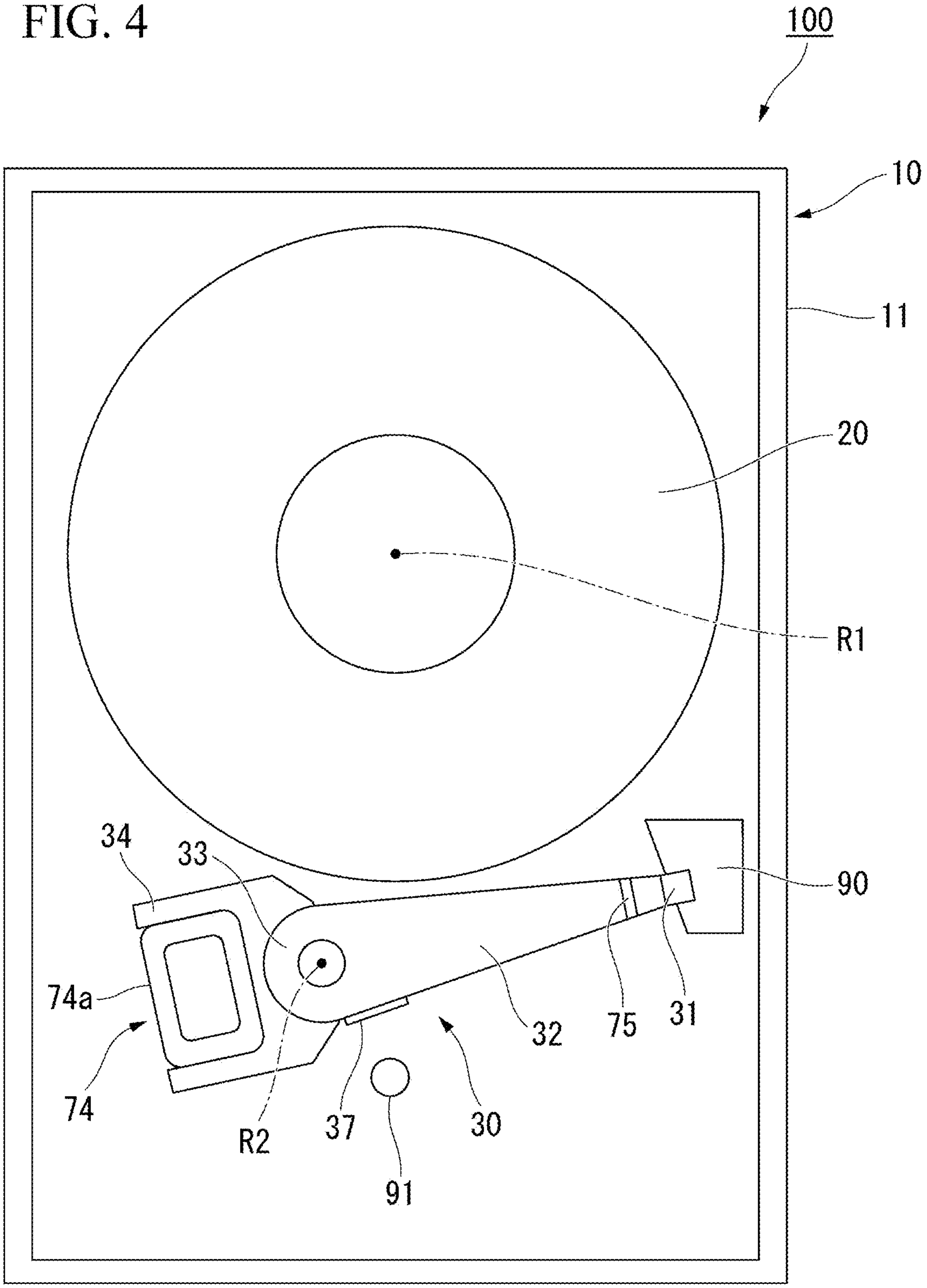
FIG. 4 is a diagram illustrating a state in which a position of a head is fixed by a lock mechanism according to the embodiment.

The lock mechanism 90 is a mechanism for fixing the position θ of the head 31 to a position separated from the disk 20. In the present embodiment, the lock mechanism 90 is a ramp mechanism. FIG. 4 is a diagram illustrating a state in which the position θ of the head 31 is fixed by the lock mechanism 90. As illustrated in FIG. 4, the head 31 is held by the lock mechanism 90 at the position at which the head 31 does not face the recording surface of the disk 20. The position at which the head 31 is held by the lock mechanism 90 is a position at which the head 31 is located on the outermost side in the radial direction centered on the first rotation axis R1. The lock mechanism 90 may be a mechanism having any structure as long as it can fix the position θ of the head 31 to a position separated from the disk 20.

Figure 5:
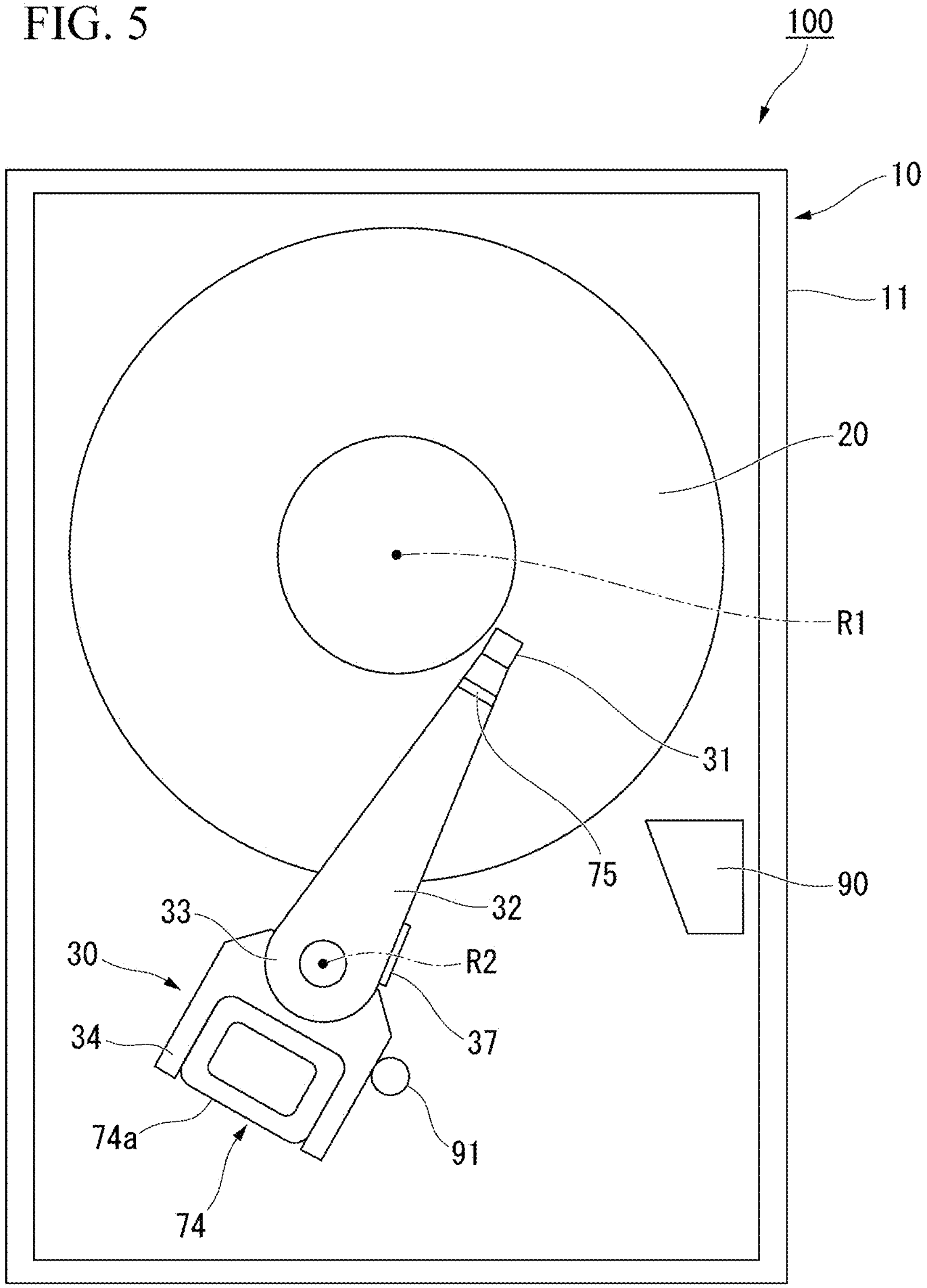
FIG. 5 is a diagram illustrating a state in which a head assembly according to the embodiment is in contact with a stopper.

The stopper 91 faces the head assembly 30 in the moving direction of the head assembly 30. The stopper 91 can come into contact with the head assembly 30 in a moving direction of the head assembly 30. In the present embodiment, the moving direction of the head assembly 30 is the circumferential direction about the second rotation axis R2. FIG. 5 is a diagram illustrating a state in which the head assembly 30 is in contact with the stopper 91. In the present embodiment, the stopper 91 comes into contact with the holding unit 34 of the body 30*a*. The stopper 91 may come into contact with any position of the head assembly 30. The position θ of the head 31 when the head assembly 30 comes into contact with the stopper 91 is a position at which the head 31 is located on the innermost side in the radial direction centered on the first rotation axis R1. Excessive movement of the head 31 on the inner side in the radial direction centered on the first rotation axis R1 can be curbed by the stopper 91.

The control device 40 is a device that controls the disk drive 100. As illustrated in FIG. 1, the control device 40 is attached to, for example, an outer surface of the case 10. For example, at least a part of the control device 40 is exposed to the outside of the case 10. The control device 40 includes a circuit board 40*a*. The circuit board 40*a* is a printed circuit board (PCB).

As illustrated in FIG. 2, the control device 40 includes a controller 44, a driver IC 45, a first volatile memory 51, a second volatile memory 52, a nonvolatile memory 53, and an A/D conversion circuit 46. The controller 44, the driver IC 45, the first volatile memory 51, the second volatile memory 52, the nonvolatile memory 53, and the A/D conversion circuit 46 are mounted on, for example, the circuit board 40*a*.

The controller 44 is a system controller that controls the disk drive 100. The controller 44 is, for example, a large scale integration (LSI) circuit called system-on-a-chip (SoC) in which a plurality of elements such as microprocessors are integrated on a single chip. The controller 44 is electrically connected to the driver IC 45, the first volatile memory 51, the second volatile memory 52, the nonvolatile memory 53, and the A/D conversion circuit 46. The controller 44 includes a processor 41, a hard disk controller 42, and a read/write channel 43.

The hard disk controller 42 controls data transmission between the host device 80 and the read/write channel 43 on the basis of an instruction from the processor 41. The hard disk controller 42 is electrically connected to the processor 41, the read/write channel 43, the head amplifier IC 37, the driver IC 45, the first volatile memory 51, the second volatile memory 52, and the nonvolatile memory 53. The hard disk controller 42 includes an interface control unit 42*a*, a buffer control unit 42*b*, and a format control unit 42*c*. The interface control unit 42*a* controls an interface with the host device 80. The interface control unit 42*a* reads an instruction input from the host device 80 and performs reception and transmission of data and the like. The buffer control unit 42*b* temporarily stores data input from the host device 80 via the interface control unit 42*a* and data read from the disk 20 in the first volatile memory 51. The format control unit 42*c* converts formats of data input from the buffer control unit 42*b* and data input from the read/write channel 43.

Figure 6:
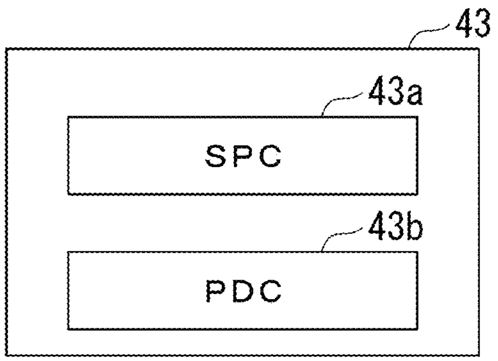
FIG. 6 is a block diagram illustrating an example of a configuration of a read/write channel according to the embodiment.

The read/write channel 43 performs signal processing of data transmitted from the disk 20 to the host device 80 and signal processing of data transmitted from the host device 80 to the disk 20 on the basis of an instruction from the processor 41. The read/write channel 43 has, for example, a function of measuring signal quality of data. FIG. 6 is a block diagram illustrating an example of a configuration of the read/write channel 43. As illustrated in FIG. 6, the read/write channel 43 includes a signal processing circuit 43*a* and a position detecting circuit 43*b*. The signal processing circuit 43*a* processes servo information read from a read head included in the heads 31 and a read signal and a write signal corresponding to user data read from the read head included in the heads 31. The position detecting circuit 43*b* extracts the servo information from the read signal and generates a position detection signal for detecting the position θ of the head 31.

Figure 7:
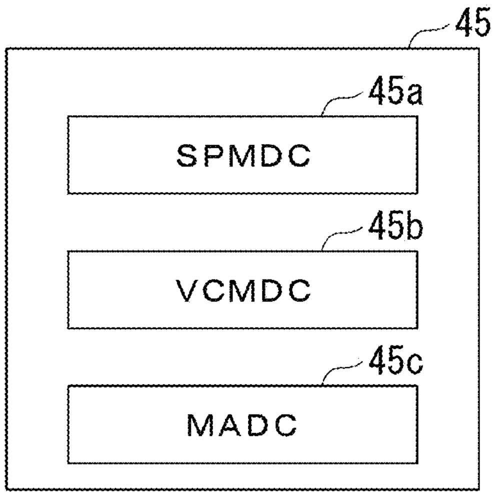
FIG. 7 is a block diagram illustrating an example of a configuration of a driver IC according to the embodiment.

The driver IC 45 controls the spindle motor 72 and the actuator 73 on the basis of an instruction from the controller 44. FIG. 7 is a block diagram illustrating an example of a configuration of the driver IC 45. As illustrated in FIG. 7, the driver IC 45 includes a first drive circuit 45*a*, a second drive circuit 45*b*, and a third drive circuit 45*c*. The first drive circuit 45*a* is a circuit for driving the spindle motor 72. The second drive circuit 45*b* is a circuit for driving the voice coil motor 74. The third drive circuit 45*c* is a circuit for driving the microactuators 75.

As illustrated in FIG. 2, the A/D conversion circuit 46 converts an analog signal input from the vibration sensor 76 to a digital signal and outputs the digital signal to the processor 41. The vibration sensor 76 is a sensor that can sense vibration applied to the disk drive 100. In the present embodiment, the vibration sensor 76 is an acceleration sensor. The vibration sensor 76 may be any sensor as long as it can detect vibration applied to the disk drive 100.

The first volatile memory 51 and the second volatile memory 52 are semiconductor memories in which data stored therein disappears when supply of electric power is cut off. In the present embodiment, data is temporarily stored in the first volatile memory 51 by the buffer control unit 42*b*. In the present embodiment, the first volatile memory 51 is a dynamic random access memory (DRAM). In the present embodiment, the first volatile memory 51 is used as a cache of read data read from the disk 20 and write data written to the disk 20. Data or the like required for processing of the constituents of the disk drive 100 is stored in the second volatile memory 52. In the present embodiment, the second volatile memory 52 is a static random access memory (SRAM). The first volatile memory 51 and the second volatile memory 52 may be unified as a single volatile memory. The first volatile memory 51 may be an SRAM, a synchronous dynamic random access memory (SDRAM), a ferroelectric random access memory (FeRAM), a magnetoresistive random access memory (MRAM), or the like. The second volatile memory 52 may be a DRAM, an SDRAM, an FeRAM, an MRAM, or the like.

The nonvolatile memory 53 is a semiconductor memory in which data stored therein is continuously stored even when supply of electric power is cut off. In the present embodiment, the nonvolatile memory 53 is a flash memory. The nonvolatile memory 53 is an NOR-type or NAND-type flash memory. At least a part of a program for driving the disk drive 100, data required before reading or writing of data with respect to the disk 20 is performed, and the like are stored in the nonvolatile memory 53.

Outlined arrows in FIG. 2 indicate a flow of user data UD. The user data UD input from the host device 80 to the disk drive 100 is input to the buffer control unit 42*b* via the interface control unit 42*a* and is temporarily stored in the first volatile memory 51 by the buffer control unit 42*b*. The user data UD stored in the first volatile memory 51 is read by the buffer control unit 42*b* and is converted into a format which can be stored in the disk 20 by the format control unit 42*c*. The user data UD which is a conversion result is transmitted to the head amplifier IC 37 via the read/write channel 43 and is written from the head 31 to the disk 20. When the user data UD written to the disk 20 is read by the host device 80, for example, the user data UD is read in the reversed order of the order in which the user data UD is written to the disk 20.

The processor 41 is a central processing unit (CPU) that controls the constituents of the disk drive 100. The processor 41 controls the actuator 73 via the driver IC 45 and performs servo control for positioning the head 31. The processor 41 controls the spindle motor 72 via the first drive circuit 45*a* of the driver IC 45 such that the disk 20 is rotated. The processor 41 controls an operation (a write operation) of writing data to the disk 20. The processor 41 selects a storage destination of data to be written to the disk 20. The processor 41 controls an operation (a reading operation) of reading data stored in the disk 20. The processor 41 controls processing data to be read from the disk 20. The processor 41 is electrically connected to the constituents of the disk drive 100.

The processor 41 is configured to perform a first calculation process CP1, a second calculation process CP2, and an alternative process AP. That is, a control method that is performed by the control device 40 includes the first calculation process CP1, the second calculation process CP2, and the alternative process AP. The first calculation process CP1 is a calculation process that is performed to control the position θ of the head 31. The processor 41 performs servo control for positioning the head 31 by performing the first calculation process CP1. The first calculation process CP1 includes a plurality of control processes CTP. In the present embodiment, the plurality of control processes CTP include a voice coil motor control process, a microactuator control process, a post code control process, a feedforward control process. The voice coil motor control process is a control process CTP of controlling the voice coil motor 74. The microactuator control process is a control process CTP of controlling the microactuators 75. The post code control process is a control process CTP of correcting the position θ of the head 31 using a post code including correction data for correcting an error due to distortion of a track of the disk 20. The feedforward control process is a control process CTP of correcting the position θ of the head 31 through feedforward control based on an output value of the vibration sensor 76.

Figure 8:
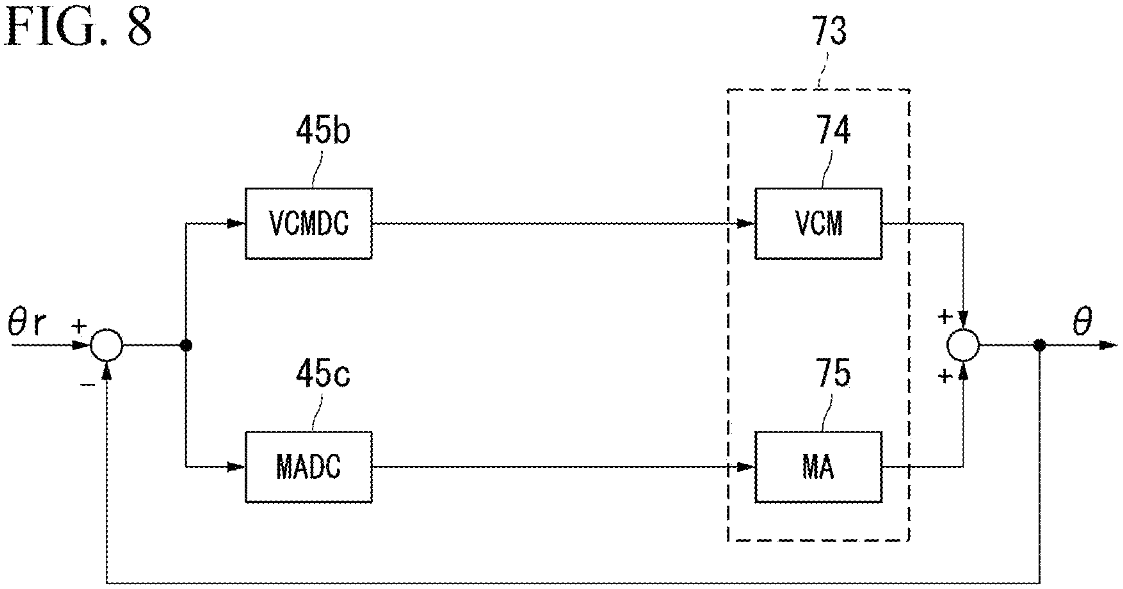
FIG. 8 is a block diagram illustrating a voice coil motor control process and a microactuator control process according to the embodiment.

FIG. 8 is a block diagram illustrating the voice coil motor control process and the microactuator control process. As illustrated in FIG. 8, the actuator 73 is controlled through feedback control in which a current position θ of the head 31 with respect to a target value θr of the position θ of the head 31 is fed back. The current position θ of the head 31 is detected by the position detecting circuit 43*b*. The target value θr is input to the second drive circuit 45*b* and the third drive circuit 45*c*. The second drive circuit 45*b* outputs an output value such as a current to the voice coil motor 74 on the basis of the input target value θr. The third drive circuit 45*c* outputs an output value such as a current to the microactuators 75 on the basis of the input target value θr. The voice coil motor 74 and the microactuators 75 are driven on the basis of the output values such as the currents input from the drive circuits, and the heads 31 are positioned.

The second calculation process CP2 is a calculation process that can be performed at the same time as the first calculation process CP1. In the present embodiment, the second calculation process CP2 is a process that is performed to improve the throughput of the disk drive 100. In the present embodiment, the processor 41 can perform a plurality of second calculation processes CP2. The plurality of second calculation processes CP2 include a process of generating a digital filter which is used to control the actuator 73 for moving the head 31. The plurality of second calculation processes CP2 include a first VCM filter generating process, a second VCM filter generating process, a first MA filter generating process, and a second MA filter generating process. The first VCM filter generating process is a process of generating one VCM filter 78*va* for correcting an input value input to the voice coil motor 74. The second VCM filter generating process is a process of generating two VCM filters 78*va* and 78*vb* for correcting an input value input to the voice coil motor 74. The first MA filter generating process is a process of generating one MA filter 78*ma* for correcting an input value input to the microactuators 75. The second MA filter generating process is a process of generating two MA filters 78*ma* and 78*mb* for correcting an input value input to the microactuators 75.

Figure 9:
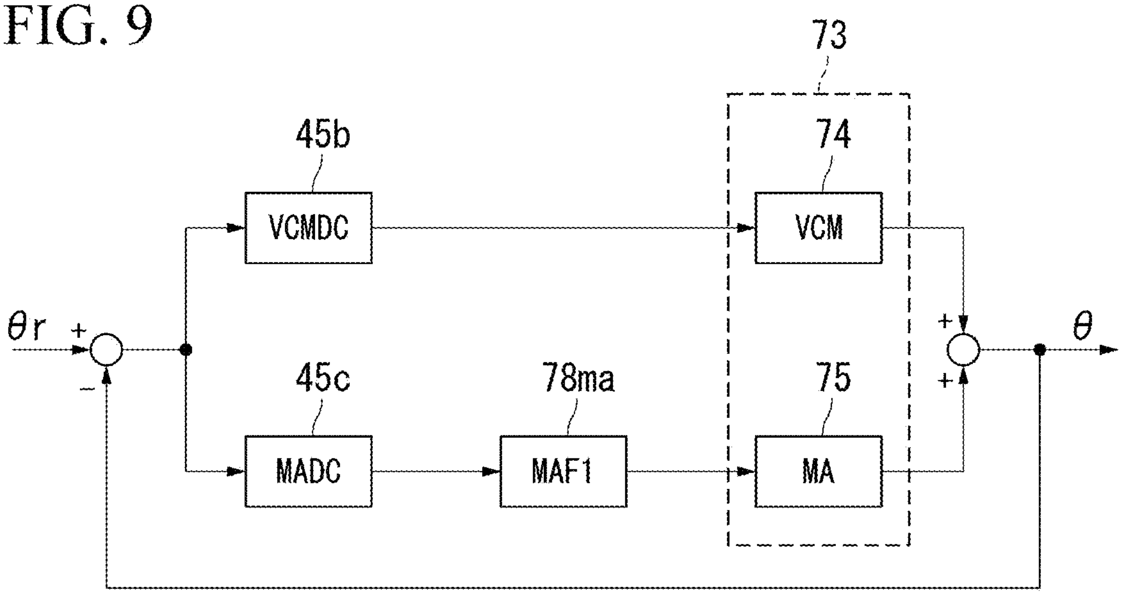
FIG. 9 is a block diagram illustrating a voice coil motor control process and a microactuator control process when a first MA filter generating process is performed according to the embodiment.
Figure 10:
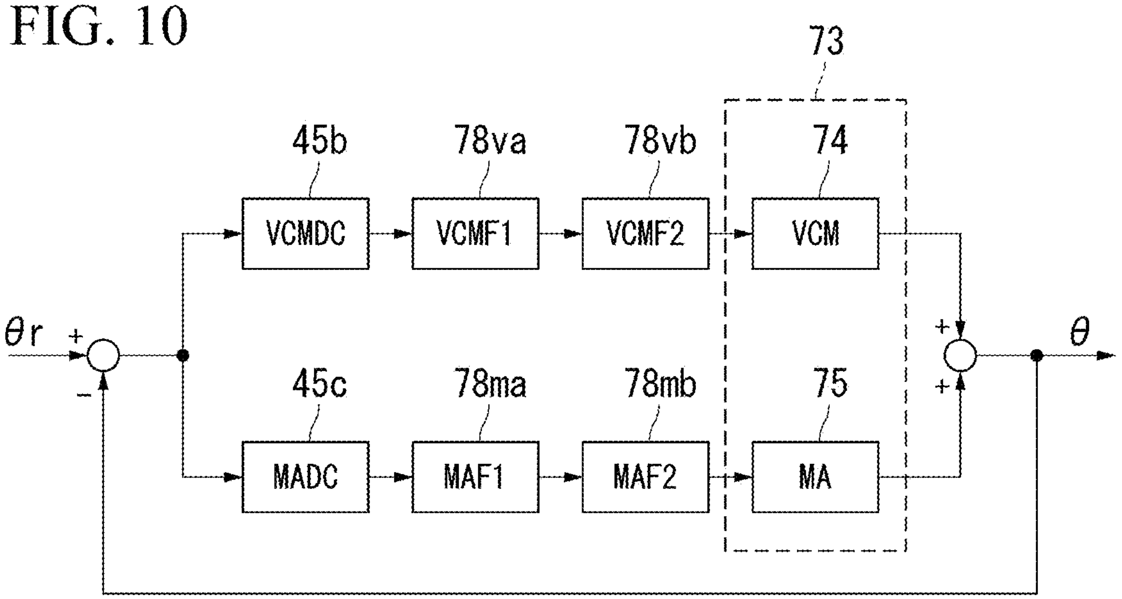
FIG. 10 is a block diagram illustrating a voice coil motor control process and a microactuator control process when a second VCM filter generating process and a second MA filter generating process are performed according to the embodiment.

FIG. 9 is a block diagram illustrating the voice coil motor control process and the microactuator control process when the first MA filter generating process is performed. As illustrated in FIG. 9, when an MA filter 78*ma* is generated in the first MA filter generating process, an output value from the third drive circuit 45*c* is corrected by the MA filter 78*ma* and is then input to the microactuators 75. FIG. 10 is a block diagram illustrating the voice coil motor control process and the microactuator control process when the second VCM filter generating process and the second MA filter generating process are performed. As illustrated in FIG. 10, when two VCM filters 78*va* and 78*vb* are generated in the second VCM filter generating process, an output value from the second drive circuit 45*b* is corrected by the two VCM filters 78*va* and 78*vb* and is then input to the voice coil motor 74. When two MA filters 78*ma* and 78*mb* are generated in the second MA filter generating process, an output value from the third drive circuit 45*c* is corrected by the two MA filters 78*ma* and 78*mb* and is then input to the microactuators 75.

Table 1 is a table showing an example of a first processing time TA [microseconds (ms)] which is required until the second calculation process CP2 is completed when the processor 41 performs only the second calculation process CP2 for each second calculation process CP2. The first processing time TA is a time which is required until each second calculation process CP2 is completed when the processor 41 can exhibit 100% of processing capability. Each first processing time TA shown in Table 1 is information which is stored in a predetermined storage medium provided in the disk drive 100. In the present embodiment, the predetermined storage medium is the nonvolatile memory 53. The predetermined storage medium may be the disk 20 or may include the nonvolatile memory 53 and the disk 20.

TABLE 1

| Second calculation process CP2 | First processing time TA [ms] |
|---|---|
| First VCM filter generating process | 80 |
| Second VCM filter generating process | 160 |
| First MA filter generating process | 100 |
| Second MA filter generating process | 200 |

As shown in Table 1, the first processing time TA of the second VCM filter generating process of generating two VCM filters 78*va* and 78*vb* is greater than the first processing time TA of the first VCM filter generating process of generating one VCM filter 78*va*. The first processing time TA of the second MA filter generating process of generating two MA filters 78*ma* and 78*mb* is greater than the first processing time TA of the first MA filter generating process of generating one MA filter 78*ma*. The first processing time TA of the first MA filter generating process is greater than the first processing time TA of the first VCM filter generating process. The first processing time TA of the second MA filter generating process is greater than the first processing time TA of the second VCM filter generating process.

The plurality of second calculation processes CP2 may include a process other than the process of generating a digital filter. The plurality of second calculation processes CP2 may include, for example, a process of generating a digital filter for correcting a signal from the vibration sensor 76. The plurality of second calculation processes CP2 may include a process of adjusting parameters used for other control of the head 31.

The alternative process AP is a process that is performed to hold the position θ of the head 31 to a predetermined position with a calculation load smaller than that of the first calculation process CP1. The predetermined position may be a position with a certain range. The predetermined position may be any position as long as it is the position θ of the head 31 held through the alternative process AP performed by the processor 41. In the present disclosure, "the position θ of the head 31 is held at a predetermined position in the alternative process AP" means a state in which the head 31 is located at a position determined by causing the processor 41 to perform the alternative process AP.

The alternative process AP is performed instead of the first calculation process CP1. When the alternative process AP is performed, the first calculation process CP1 is stopped. The alternative process AP is not particularly limited as long as it is a process of holding the position θ of the head 31 at a predetermined position. That is, writing of data to the disk 20 and reading of data from the disk 20 may not be able to be performed using the head 31 held at the predetermined position in the alternative process AP. In the present embodiment, when the head 31 is held at a predetermined position through a retreat process AP1 and a pressing process AP2, writing of data to the disk 20 and reading of data from the disk 20 cannot be performed using the head 31. When the head 31 is held at a predetermined position through an idle operation process AP3 and a simple control process AP4, writing of data to the disk 20 and reading of data from the disk 20 may be possible or may not be possible using the head 31.

In the present embodiment, the processor 41 is configured to perform a plurality of alternative processes AP. The plurality of alternative processes AP include a retreat process AP1, a pressing process AP2, an idle operation process AP3, and a simple control process AP4.

The retreat process AP1 is an alternative process AP that is performed to fix the position θ of the head 31 using the lock mechanism 90. In the retreat process AP1, the processor 41 rotates the head assembly 30 about the second rotation axis R2 using the actuator 73 and fixes the head 31 to the lock mechanism 90 as illustrated in FIG. 4. Accordingly, the position θ of the head 31 is held at a predetermined position at which the head 31 is fixed to the lock mechanism 90. In the state in which the head 31 is fixed to the lock mechanism 90, the position θ of the head 31 is held at the predetermined position without causing the processor 41 to perform a process for controlling the position θ of the head 31. That is, the retreat process AP1 is an alternative process AP of holding the position θ of the head 31 at the predetermined position without causing a calculation load in the processor 41. Accordingly, it is possible to hold the position θ of the head 31 at the predetermined position with a calculation load smaller than that of the first calculation process CP1 through the retreat process AP1.

The pressing process AP2 is an alternative process AP that is performed to control the head assembly 30 such that the head assembly 30 comes into contact with the stopper 91. In the pressing process AP2, the processor 41 rotates the head assembly 30 about the second rotation axis R2 using the actuator 73 and brings the head assembly 30 into contact with the stopper 91 as illustrated in FIG. 5. In the pressing process AP2, the processor 41 controls the head assembly 30 such that the state in which the head assembly 30 is in contact with the stopper 91 is held. Accordingly, the position θ of the head 31 is held at the predetermined position at which the head assembly 30 is in contact with the stopper 91. When control is performed such that the head assembly 30 comes into contact with the stopper 91, the calculation load of the processor 41 is smaller than that when control is performed such that the head assembly 30 is held at a specific position at which it does not come into contact with another component in the circumferential direction around the second rotation axis R2. Accordingly, it is possible to hold the position θ of the head 31 at the predetermined position with a calculation load smaller than that of the first calculation process CP1 through the pressing process AP2.

The idle operation process AP3 is an alternative process AP that is performed to control the position θ of the head 31 in a sampling period longer than that of the first calculation process CP1. In the idle operation process AP3, only the voice coil motor 74 in the actuator 73 is controlled, and the microactuators 75 are not controlled. The idle operation process AP3 is the same as the first calculation process CP1 except that the sampling period is longer than that of the first calculation process CP1 and the microactuators 75 are not controlled. In the idle operation process AP3, since the position θ of the head 31 is controlled, the head 31 is held at a predetermined position. In the idle operation process AP3, the position θ of the head 31 is held at a position at which the head 31 is located when the first calculation process CP1 is switched to the idle operation process AP3. Since the idle operation process AP3 has a sampling period longer than that of the first calculation process CP1 and the microactuators 75 are not controlled, the calculation load of the processor 41 when the idle operation process AP3 is performed is smaller than that when the first calculation process CP1 is performed. Accordingly, it is possible to hold the position θ of the head 31 at the predetermined position with a calculation load smaller than that of the first calculation process CP1 through the idle operation process AP3.

The simple control process AP4 is an alternative process AP that is performed to control the position θ of the head 31 without performing at least one of the plurality of control processes CTP. In the simple control process AP4, at least one of the plurality of control processes CTP included in the first calculation process CP1 is not performed. The simple control process AP4 is the same as the first calculation process CP1 except that at least one control process CTP is not performed. In the simple control process AP4 according to the present embodiment, the microactuator control process, the post code control process, and the feedforward control process are not performed. In the simple control process AP4, when at least one of the plurality of control processes CTP is not performed, one or more of the microactuator control process, the post code control process, and the feedforward control process may be performed. In the simple control process AP4, since the position θ of the head 31 is controlled, the head 31 is held at a predetermined position. In the simple control process AP4, the position θ of the head 31 is held at a position at which the head 31 is located when the first calculation process CP1 is switched to the simple control process AP4. Since at least one control process CTP is not performed, the calculation load of the processor 41 when the simple control process AP4 is performed is smaller than that when the first calculation process CP1 is performed. Accordingly, it is possible to hold the position θ of the head 31 at the predetermined position with a calculation load smaller than that of the first calculation process CP1 through the simple control process AP4.

Until the position θ of the head 31 is held at a predetermined position through the alternative process AP instead of the first calculation process CP1, a predetermined time corresponding to the alternative process AP is required. The time required until the position θ of the head 31 is held at a predetermined position through the alternative process AP instead of the first calculation process CP1 is a second processing time TB. When the first calculation process CP1 stopped by performing the alternative process AP is restarted, a predetermined time corresponding to the alternative process AP is required. The time required to restart the first calculation process CP1 stopped by performing the alternative process AP is a third processing time TC.

Table 2 is a table showing an example of the second processing time TB [ms] and the third processing time TC [ms] in each alternative process AP. In Table 2, an example of a first process occupancy ratio k1 of the processor 41 required for performing the first calculation process CP1 and an example of a second process occupancy ratio k2 of the processor 41 required for holding the position θ of the head 31 through the alternative process AP are also shown. The second processing times TB, the third processing times TC, the first process occupancy ratios k1, and the second process occupancy ratios k2 shown in Table 2 are information stored in the nonvolatile memory 53 which is a predetermined storage medium.

TABLE 2

| | Second processing time TB [ms] | Third processing time TC [ms] | First process occupancy ratio k1 | Second process occupancy ratio k2 |
|---|---|---|---|---|
| First calculation process CP1 | — | — | 0.75 | — |
| Retreat process AP1 | 50 | 50 | — | 0 |
| Pressing process AP2 | 20 | 20 | — | 0.1 |
| Idle operation process AP3 | 5 | 5 | — | 0.5 |
| Simple control process AP4 | 1 | 1 | — | 0.6 |

As shown in Table 2, in the retreat process AP1, since the head 31 needs to be moved to the lock mechanism 90, the second processing time TB is longer than those of the other alternative processes AP. Since the head 31 needs to be moved from the lock mechanism 90 to a position facing the disk 20 in order to restart the first calculation process CP1 stopped by performing the retreat process AP1, the third processing time TC is longer than those of the other alternative processes AP. On the other hand, in the retreat process AP1, since the head 31 can be held at the predetermined position without causing the processor 41 to perform an arithmetic operation after fixing the head 31 to the lock mechanism 90, the second process occupancy ratio k2 is zero.

In the pressing process AP2, since the head assembly 30 needs to be moved to a position at which it comes into contact with the stopper 91, the second processing time TB is longer than those of the idle operation process AP3 and the simple control process AP4. On the other hand, the time required for moving the head assembly 30 to the position at which it comes into contact with the stopper 91 is shorter than the time required for moving the head 31 to the lock mechanism 90. Accordingly, the second processing time TB in the pressing process AP2 is shorter than the second processing time TB in the retreat process AP1. For the same reason, in the pressing process AP2, the third processing time TC is longer than those of the idle operation process AP3 and the simple control process AP4, and the third processing time TC is shorter than that of the retreat process AP1. In the pressing process AP2, since control for bringing the head assembly 30 into contact with the stopper 91 needs to be performed, the processor 41 needs to perform a calculation process to a certain extent. Accordingly, the second process occupancy ratio k2 in the pressing process AP2 is higher than the second process occupancy ratio k2 in the retreat process AP1. On the other hand, in the pressing process AP2, since the head assembly 30 may be brought into contact with the stopper 91, the second process occupancy ratio k2 is lower than those in the idle operation process AP3 and the simple control process AP4 in which the position θ of the head 31 is controlled to a certain extent.

In the idle operation process AP3 and the simple control process AP4, since the position θ of the head 31 needs to be controlled to a certain extent, the second process occupancy ratio k2 is higher than those in the retreat process AP1 and the pressing process AP2. On the other hand, in the idle operation process AP3 and the simple control process AP4. Since the head 31 does not need to be moved from a current position to another position, the second processing time TB and the third processing time TC are shorter than those of the retreat process AP1 and the pressing process AP2. In the example shown in Table 2, the second process occupancy ratio k2 in the idle operation process AP3 is lower than the second process occupancy ratio k2 in the simple control process AP4. In the example shown in Table 2, the second processing time TB in the idle operation process AP3 is longer than the second processing time TB in the simple control process AP4. In the example shown in Table 2, the third processing time TC in the idle operation process AP3 is longer than the third processing time TC in the simple control process AP4.

The second process occupancy ratios k2 in the alternative processes AP are lower than the first process occupancy ratios k1 in the first calculation process CP1. In the example shown in Table 2, the first process occupancy ratio k1 in the first calculation process CP1 is 0.75. The process occupancy ratios in the example shown in Table 2 have values at which the process occupancy ratio of the processor 41 is 100% when they are 1. That is, when the first process occupancy ratio k1 is 0.75, the process occupancy ratio of the processor 41 when the first calculation process CP1 is performed is 75%. The first process occupancy ratio k1 and the second process occupancy ratio k2 are not limited to the example shown in Table 2 and are not particularly limited. The first process occupancy ratio k1 and the second process occupancy ratio k2 are less than 1.

The control device 40 is configured to determine that the second calculation process CP2 is to be performed when the throughput of the disk drive 100 becomes less than a predetermined throughput value. In the present embodiment, determination of whether to perform the second calculation process CP2 is performed by the processor 41. That is, the processor 41 is configured to determine that the second calculation process CP2 is to be performed when the throughput of the disk drive 100 becomes less than the predetermined throughput value. Determination of whether to perform the second calculation process CP2 may be performed by a part of the control device 40 other than the processor 41. The throughput of the disk drive 100 is expressed, for example, by an amount of data which can be processed per unit time by the disk drive 100. The amount of data which can be processed per unit time by the disk drive 100 is, for example, input/output per second (IOPS) which is a throughput index of the disk drive 100. The processor 41 calculates the IOPS of the disk drive 100 on the basis of an amount of data written to the disk 20 per unit time on the basis of an instruction from the host device 80 and an amount of data read from the disk 20 per unit time on the basis of an instruction from the host device 80. Accordingly, the processor 41 measures the throughput of the disk drive 100. When the calculated IOPS becomes less than a predetermined threshold value, the processor 41 determines that the throughput of the disk drive 100 becomes less than a predetermined throughput value and determines that the second calculation process CP2 is to be performed. The predetermined threshold value is not particularly limited.

The throughput of the disk drive 100 decreases because a time required for position control of the head 31 increases due to disturbance such as vibration applied to the disk drive 100 or the like. The processor 41 determines what second calculation process CP2 out of a plurality of second calculation processes CP2 is to be performed on the basis of the decreased degree of throughput of the disk drive 100, a period and a magnitude of vibration applied to the disk drive 100, and the like. For example, when the period of vibration applied to the disk drive 100 is short, it is necessary to fast move and adjust the head 31. In this case, the processor 41 determines that a second calculation process CP2 for correcting control of the microactuators 75 with which the head 31 can be moved faster than the voice coil motor 74 is to be performed. That is, the processor 41 determines that the first MA filter generating process or the second MA filter generating process is to be performed.

The control device 40 is configured to perform a first determination process DP1. That is, a control method that is performed by the control device 40 includes the first determination process DP1. In the present embodiment, the first determination process DP1 is performed by the processor 41. That is, the processor 41 is configured to perform the first determination process DP1. The first determination process DP1 may be performed by a part of the control device 40 other than the processor 41. The control device 40 may include a dedicated calculation unit, and the first determination process DP1 may be performed by the calculation unit. The control device 40 may include a processor other than the processor 41, and the first determination process DP1 may be performed by the other processor. The other processor may be, for example, a neural processor.

The first determination process DP1 is a process that is performed on the basis of information stored in a predetermined storage medium, that is, information stored in the nonvolatile memory 53 when it is determined that the second calculation process CP2 is to be performed. The first determination process DP1 includes acquiring a first execution time TE1 expressed by $TA/(1-k1)$ and a second execution time TE2 expressed by $\{TA/(1-k2)\}+TB+TC$ on the basis of the information stored in the nonvolatile memory 53 which is the predetermined storage medium. The first execution time TE1 and the second execution time TE2 may be stored in the nonvolatile memory 53 in advance. In this case, in the first determination process DP1, the processor 41 acquires the first execution time TE1 and the second execution time TE2 from the nonvolatile memory 53. In the first determination process DP1, the processor 41 may acquire the first execution time TE1 and the second execution time TE2 through calculation using information stored in the nonvolatile memory 53. The first execution time TE1 is acquired by dividing the first processing time TA by a value obtained by subtracting the first process occupancy ratio k1 from 1. The first execution time TE1 is a time from start to completion of the second calculation process CP2 while performing the first calculation process CP1. The second execution time TE2 is acquired by summing a time obtained by dividing the first processing time TA by a value obtained by subtracting the second process occupancy ratio k2 from 1, the second processing time TB, and the third processing time TC. The second execution time TE2 is a time after the alternative process AP is started instead of the first calculation process CP1 and until the first calculation process CP1 is restarted.

The first determination process DP1 includes selecting a first execution method EM1 of performing the second calculation process CP2 while performing the first calculation process CP1 as a method of performing the second calculation process CP2 when the second execution time TE2 is equal to or longer than the first execution time TE1. The first determination process DP1 includes selecting a second execution method EM2 of performing the second calculation process CP2 after starting the alternative process AP instead of the first calculation process CP1 as the method of performing the second calculation process CP2 when the second execution time TE2 is shorter than the first execution time TE1. In the present embodiment, the second execution method EM2 is a method of performing the second calculation process CP2 after holding the position θ of the head 31 at a predetermined position through the alternative process AP instead of the first calculation process CP1.

The first determination process DP1 includes selecting the first execution method EM1 when all of a plurality of second execution times TE2 when a plurality of alternative processes AP are used are equal to or longer than the first execution time TE1. The first determination process DP1 includes selecting the second execution method EM2 using an alternative process AP in which the second execution time TE2 is the shortest when at least one of a plurality of second execution times TE2 when a plurality of alternative processes AP are used is shorter than the first execution time TE1.

Figure 11:
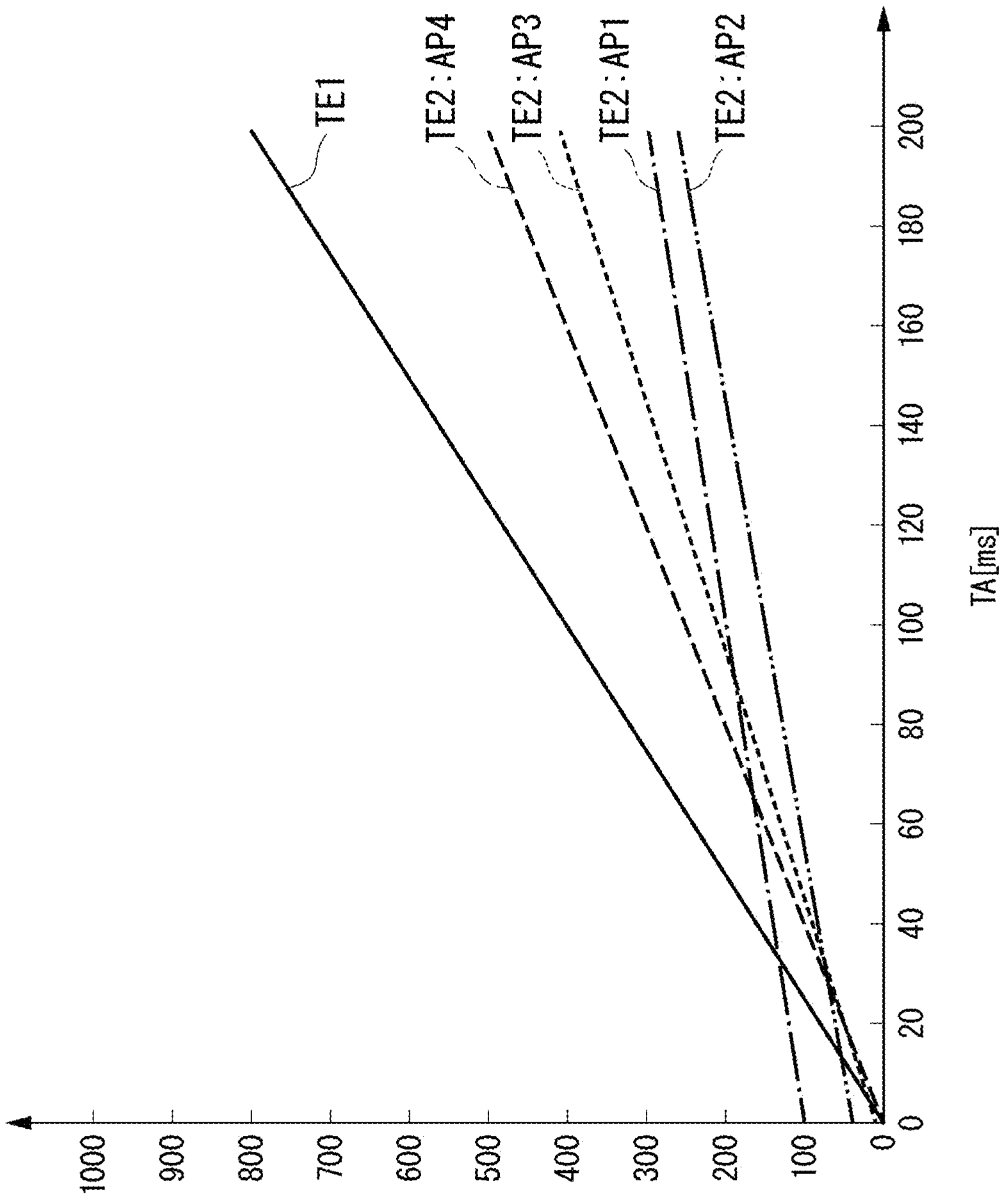
FIG. 11 is a graph illustrating an example of a relationship between a first execution time and second execution times of alternative processes and a first processing time according to the embodiment.

FIG. 11 is a graph illustrating an example of a relationship between the first execution time TE1 and the second execution times TE2 for the alternative processes AP and the first processing time TA. In FIG. 11, the horizontal axis represents the first processing time TA [ms], and the vertical axis represents the first execution time TE1 [ms] or the second execution time TE2 [ms]. In FIG. 11, a straight line indicating the first execution time TE1 is a straight line expressed by $TE1=TA/(1-k1)$. In FIG. 11, straight lines indicating the second execution times TE2 are straight lines expressed by $TE2=\{TA/(1-k2)\}+TB+TC$. The straight lines indicating the execution times illustrated in FIG. 11 are straight lines based on the values shown in Table 2.

In the example illustrated in FIG. 11, when the first processing time TA of the second calculation process CP2 is 100 [ms], all the second execution times TE2 are shorter than the first execution time TE1. Accordingly, in the first determination process DP1, the processor 41 selects the second execution method EM2 using one alternative process AP. When the first processing time TA of the second calculation process CP2 is 100 [ms], the second execution time TE2 using the pressing process AP2 out of the second execution times TE2 using a plurality of alternative processes AP is the shortest. Accordingly, in the first determination process DP1, the processor 41 selects the second execution method EM2 using the pressing process AP2. In the example illustrated in FIG. 11, when the first processing time TA of the second calculation process CP2 is 30 [ms], the second execution times TE2 other than the second execution time TE2 using the retreat process AP1 is shorter than the first execution time TE1. Accordingly, in the first determination process DP1, the processor 41 selects the second execution method EM2 using an alternative process AP other than the retreat process AP1. When the first processing time TA of the second calculation process CP2 is 30 [ms], the second execution time TE2 using the idle operation process AP3 out of the second execution times TE2 using a plurality of alternative processes AP is the shortest. Accordingly, in the first determination process DP1, the processor 41 selects the second execution method EM2 using the idle operation process AP3.

The first determination process DP1 includes transmitting a signal for inquiring about whether the second execution method EM2 is to be performed to the host device 80 having transmitted an instruction to the disk drive 100 when the second execution method EM2 is selected. In the present embodiment, the signal for inquiring about whether the second execution method EM2 is to be performed includes information on the second execution time TE2. For example, when the first processing time TA of the second calculation process CP2 is 30 [ms] and the second execution method EM2 using the idle operation process AP3 is selected, the processor 41 transmits information indicating that the second execution time TE2 is 70 [ms] to the host device 80. The first determination process DP1 includes determining whether the second execution method EM2 is to be performed on the basis of a signal from the host device 80. The host device 80 transmits a signal indicating whether the second execution method EM2 is to be performed to the control device 40 on the basis of the signal transmitted from the processor 41. The host device 80 determines whether the second execution method EM2 is to be performed, for example, in consideration of details of instructions and the number of instructions to be transmitted to the disk drive 100.

The processor 41 is configured to perform the second execution method EM2 when it is determined in the first determination process DP1 that the second execution method EM2 is to be performed on the basis of the signal from the host device 80. That is, the control method that is performed by the control device 40 includes performing the second execution method EM2 when it is determined in the first determination process DP1 that the second execution method EM2 is to be performed on the basis of the signal from the host device 80. The processor 41 is configured to perform the first execution method EM1 when it is determined in the first determination process DP1 that the second execution method EM2 is not to be performed on the basis of the signal from the host device 80. That is, the control method that is performed by the control device 40 includes performing the first execution method EM1 when it is determined in the first determination process DP1 that the second execution method EM2 is not to be performed on the basis of the signal from the host device 80.

The control device 40 is configured to perform a second determination process DP2. That is, the control method that is performed by the control device 40 includes the second determination process DP2. In the present embodiment, the second determination process DP2 is performed by the processor 41. That is, the processor 41 is configured to perform the second determination process DP2. The second determination process DP2 may be performed by a part of the control device 40 other than the processor 41. The control device 40 may include a dedicated calculation unit, and the second determination process DP2 may be performed by the calculation unit. The control device 40 may include a processor other than the processor 41, and the second determination process DP2 may be performed by the other processor. The other processor may be, for example, a neural processor.

The second determination process DP2 is a process that is performed when the second execution method EM2 is being performed. The second determination process DP2 includes determining whether a time required until the second execution method EM2 is completed is longer than the second execution time TE2 transmitted to the host device 80. In the second determination process DP2, for example, the processor 41 estimates a remaining time until the second execution method EM2 is completed when a time corresponding to a predetermined ratio of the second execution time TE2 in the performed second execution method EM2 elapses. The processor 41 estimates the remaining time on the basis of a ratio of the process completed up to now to the elapsed time. In the second determination process DP2, the processor 41 determines whether the time required until the second execution method EM2 is completed is longer than the second execution time TE2 on the basis of the estimated remaining time. The predetermined ratio ranges, for example, from about 70% to 90%. The value of the predetermined ratio is not particularly limited.

The processor 41 is configured to stop the second execution method EM2 and to perform the first execution method EM1 when it is determined in the second determination process DP2 that the time required until the second execution method EM2 is completed is longer than the second execution time TE2. That is, the control method that is performed by the control device 40 includes stopping the second execution method EM2 and performing the first execution method EM1 when it is determined in the second determination process DP2 that the time required until the second execution method EM2 is completed is longer than the second execution time TE2. When it is determined in the second determination process DP2 that the time required until the second execution method EM2 is completed is longer than the second execution time TE2, the second execution method EM2 is stopped, and the host device 80 is notified that the first execution method EM1 is to be performed. In this case, the processor 41 notifies the host device 80 that it is determined that the second calculation process CP2 is not completed in the notified second execution time TE2, that is, the second calculation process CP2 in the notified second execution time TE2 fails to be performed. The processor 41 is configured to continue to perform the second execution method EM2 when it is determined in the second determination process DP2 that the time required until the second execution method EM2 is completed is less than the second execution time TE2. When the second execution method EM2 is completed, the processor 41 immediately notifies the host device 80 that the second execution method EM2 is completed regardless of whether the second execution time TE2 transmitted to the host device 80 elapses.

When the second calculation process CP2 is completed, the control device 40 is configured to calculate the time required until the second calculation process CP2 is completed as an actual processing time APT converted to a time required until the second calculation process CP2 is completed when the processor 41 has performed only the second calculation process CP2. In the present embodiment, calculation of the actual processing time APT is performed by the processor 41. That is, when the second calculation process CP2 is completed, the processor 41 is configured to calculate the time required until the second calculation process CP2 is completed as an actual processing time APT converted to a time required until the second calculation process CP2 is completed when the processor 41 has performed only the second calculation process CP2. Calculation of the actual processing time APT may be performed by a part of the control device 40 other than the processor 41. The control device 40 may include a dedicated calculation unit, and calculation of the actual processing time APT may be performed by the calculation unit. The control device 40 may include a processor other than the processor 41, and calculation of the actual processing time APT may be performed by the other processor. The other processor may be, for example, a neural processor.

For example, in the idle operation process AP3 shown in Table 2, the second process occupancy ratio k2 is 0.5. Accordingly, when the second calculation process CP2 is completed with the second execution method EM2 using the idle operation process AP3, the processing time doubles that when the processor 41 performs only the second calculation process CP2. As a result, the processor 41 multiplies the time required until the second calculation process CP2 is completed by 0.5 to calculate the actual processing time APT.

The control device 40 is configured to update the first processing time TA stored in the nonvolatile memory 53 with the actual processing time APT when the actual processing time APT is longer than the first processing time TA stored in the nonvolatile memory 53. In the present embodiment, determination of whether the first processing time TA is to be updated and the updating process are performed by the processor 41. That is, the processor 41 is configured to update the first processing time TA stored in the nonvolatile memory 53 with the actual processing time APT when the actual processing time APT is longer than the first processing time TA stored in the nonvolatile memory 53. The determination of whether the first processing time TA is to be updated and the updating process may be performed by a part of the control device 40 other than the processor 41. The control device 40 may include a dedicated calculation unit, and the determination of whether the first processing time TA is to be updated and the updating process may be performed by the calculation unit. The control device 40 may include a processor other than the processor 41, and the determination of whether the first processing time TA is to be updated and the updating process may be performed by the other processor. The other processor may be, for example, a neural processor.

The control device 40 is configured not to update the first processing time TA stored in the nonvolatile memory 53 when the actual processing time APT is equal to or shorter than the first processing time TA stored in the nonvolatile memory 53. That is, the processor 41 is configured not to update the first processing time TA stored in the nonvolatile memory 53 when the actual processing time APT is equal to or shorter than the first processing time TA stored in the nonvolatile memory 53.

The control device 40 is configured to store a difference time between the actual processing time APT and the first processing time TA in the nonvolatile memory 53 when the second calculation process CP2 is completed and the actual processing time APT is longer than the first processing time TA stored in the nonvolatile memory 53. In the present embodiment, the process of storing the difference time in the nonvolatile memory 53 is performed by the processor 41. That is, the processor 41 is configured to store a difference time between the actual processing time APT and the first processing time TA in the nonvolatile memory 53 when the second calculation process CP2 is completed and the actual processing time APT is longer than the first processing time TA stored in the nonvolatile memory 53. The process of storing the difference time in the nonvolatile memory 53 may be performed by a part of the control device 40 other than the processor 41. The control device 40 may include a dedicated calculation unit, and the process of storing the difference time in the nonvolatile memory 53 may be performed by the calculation unit. The control device 40 may include a processor other than the processor 41, and the process of storing the difference time in the nonvolatile memory 53 may be performed by the other processor. The other processor may be, for example, a neural processor.

For example, it is assumed that the actual processing time APT is 120 [ms] when the first MA filter generating process is performed as the second calculation process CP2. At this time, when the first processing time TA of the first MA filter generating process stored in the nonvolatile memory 53 is 100 [ms] as shown in Table 1, the actual processing time APT is longer than the first processing time TA. In this case, the processor 41 updates the first processing time TA of the first MA filter generating process stored in the nonvolatile memory 53 from 100 [ms] to 120 [ms]. In this case, the processor 41 stores 20 [ms] as the difference time between the actual processing time APT and the first processing time TA in the nonvolatile memory 53. The difference time is stored in the nonvolatile memory 53 for each second calculation process CP2. For example, when the difference time is stored and a difference time of the second calculation process CP2 is stored in advance, the processor 41 updates the difference time when the difference time to be stored is longer than the difference time stored in advance. The processor 41 may store a plurality of difference times in the nonvolatile memory 53 for each second calculation process CP2.

Figure 12:
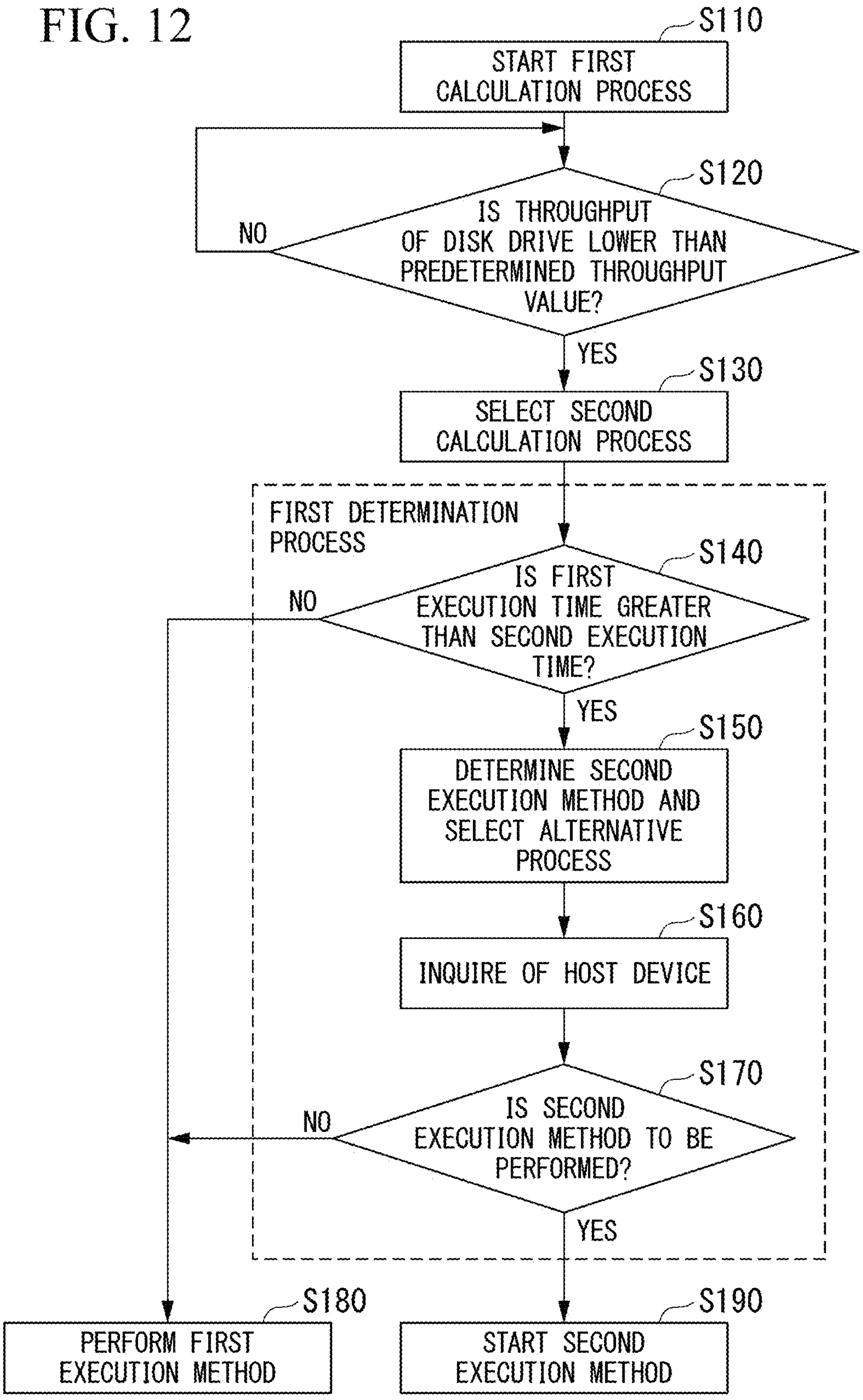
FIG. 12 is a flowchart illustrating some processes which are performed by a control device according to the embodiment.
Figure 13:
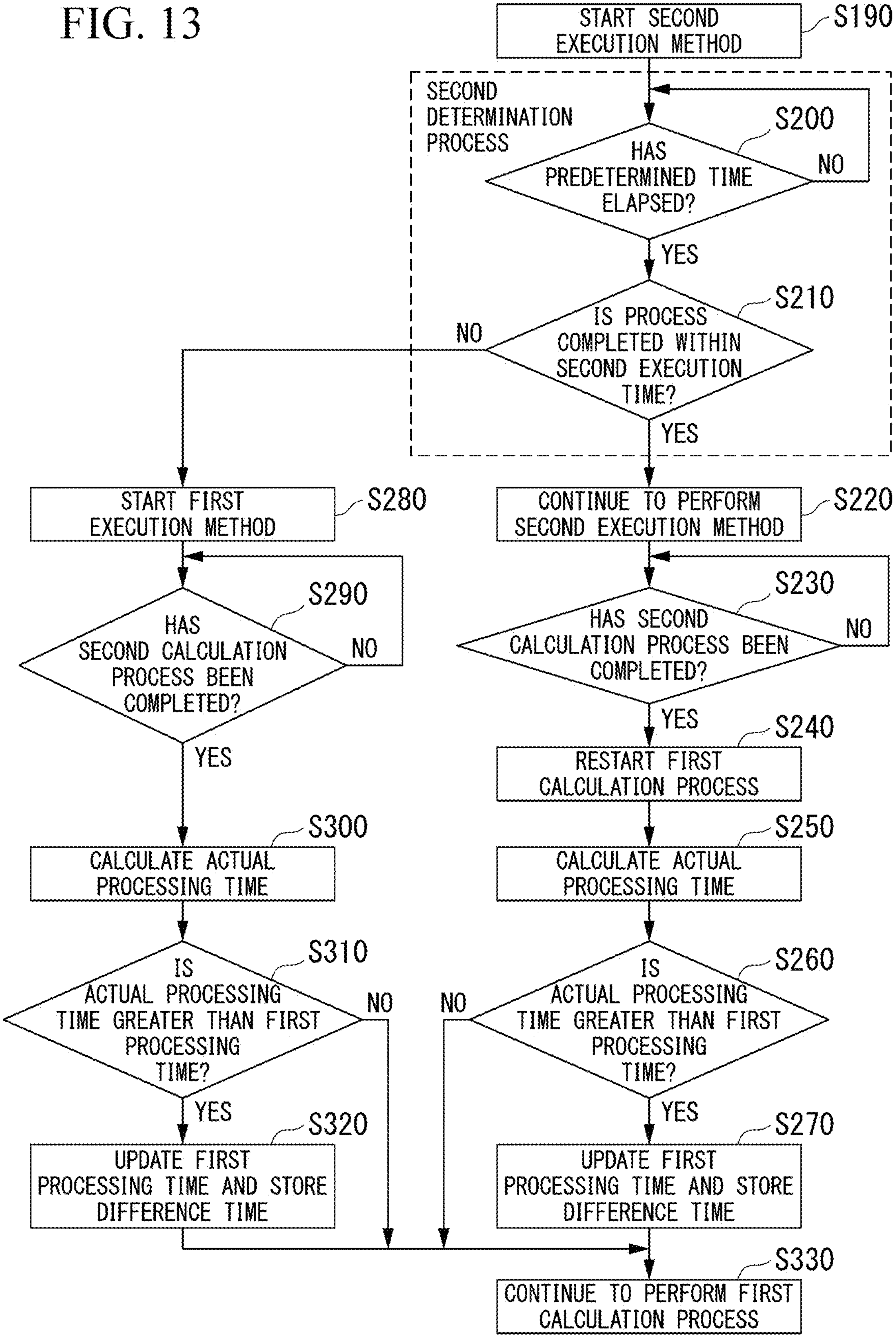
FIG. 13 is a flowchart illustrating other processes which are performed by the control device according to the embodiment.

FIG. 12 is a flowchart illustrating some processes that are performed by the control device 40. FIG. 13 is a flowchart illustrating other processes that are performed by the control device 40. In the present embodiment, the control device 40 performs the processes illustrated in FIGS. 12 and 13 using the processor 41. As illustrated in FIG. 12, the processor 41 starts the first calculation process CP1 on the basis of an instruction from the host device 80 (Step S110). Accordingly, the position θ of the head 31 is controlled through the first calculation process CP1. When the first calculation process CP1 is started, the processor 41 determines whether the throughput of the disk drive 100 is less than a predetermined throughput value (Step S120). In Step S120, the processor 41 performs the determination by comparing the IOPS of the disk drive 100 calculated as described above with a predetermined threshold value. When it is determined in Step S120 that the throughput of the disk drive 100 is equal to or greater than the predetermined throughput value (Step S120: NO), the processor 41 continues to perform the first calculation process CP1. When it is determined in Step S120 that the throughput of the disk drive 100 is less than the predetermined throughput value (Step S120: YES), the processor 41 determines that the second calculation process CP2 is to be performed and selects the second calculation process CP2 to be performed out of a plurality of second calculation processes CP2 (Step S130). In Step S130, the processor 41 determines the second calculation process CP2 to be performed as described above.

After the second calculation process CP2 to be performed has been determined, the processor 41 determines whether the first execution time TE1 is longer than the second execution time TE2 when the determined second calculation process CP2 is performed (Step S140). The processor 41 performs the determination of Step S140 on the basis of the relationship between the first execution time TE1 and the second execution times TE2 and the first processing time TA as illustrated in FIG. 11. In Step S140, the processor 41 determines whether the first execution time TE1 is longer than the corresponding second execution times TE2 when the corresponding alternative processes AP are performed with reference to the first execution time TE1 and the second execution time TE2 corresponding to the first processing time TA of the determined second calculation process CP2. When it is determined in Step S140 that the first execution time TE1 is equal to or shorter than the second execution times TE2 (Step S140: NO), the processor 41 performs the first execution method EM1 (Step S180). That is, when it is determined in Step S140 that the first execution time TE1 is equal to or shorter than the second execution times TE2, the processor 41 performs the second calculation process CP2 while performing the first calculation process CP1. The first execution method EM1 is performed until the second calculation process CP2 is completed. After the second calculation process CP2 has been completed and the first execution method EM1 has ended, the processor 41 continues to perform the first calculation process CP1.

When it is determined in Step S140 that the first execution time TE1 is longer than the second execution times TE2 (Step S140: YES), the processor 41 determines that the second execution method EM2 is to be performed and selects an alternative process AP (Step S150). In Step S150, the processor 41 selects an alternative process AP in which the second execution time TE2 is the shortest when the selected second calculation process CP2 is performed on the basis of the information illustrated in FIG. 11.

After the alternative process AP has been selected, the processor 41 transmits a signal for inquiring about whether the second execution method EM2 using the selected alternative process AP is to be performed to the host device 80 (Step S160). The host device 80 having received the signal transmits a signal indicating whether the processor 41 is to perform the second execution method EM2 to the disk drive 100 in consideration of a current processing situation of data. The processor 41 determines whether the second execution method EM2 is to be performed on the basis of the signal transmitted from the host device 80 (Step S170). In Step S170, the processor 41 determines that the second execution method EM2 is to be performed when the signal transmitted from the host device 80 is a signal indicating that the second execution method EM2 is to be performed (Step S170: YES). In Step S170, the processor 41 determines that the second execution method EM2 is not to be performed when the signal transmitted from the host device 80 is a signal indicating that the second execution method EM2 is not to be performed (Step S170: NO).

When it is determined in Step S170 that the second execution method EM2 is not to be performed (Step S170: NO), the processor 41 does not perform the second execution method EM2 and performs the first execution method EM1 (Step S180). When it is determined in Step S170 that the second execution method EM2 is to be performed (Step S170: YES), the processor 41 starts the second execution method EM2 (Step S190). In the present embodiment, the order of Steps S140 to S170 is an example of the order of the first determination process DP1.

As illustrated in FIG. 13, after the second execution method EM2 has been started, the processor 41 determines whether a predetermined time has elapsed after the second execution method EM2 has been started (Step S200). The predetermined time is a time of the predetermined ratio of the second execution time TE2. For example, when the second execution time TE2 is 200 [ms] and the predetermined ratio is 80%, the predetermined time 160 [ms]. When it is determined in Step S200 that the predetermined time has not elapsed after the second execution method EM2 has been started (Step S200: NO), the processor 41 continues to perform the second execution method EM2. When it is determined in Step S200 that the predetermined time has elapsed after the second execution method EM2 has been started (Step S200: YES), the processor 41 determines whether the processes of the second execution method EM2 is completed within the second execution time TE2 (Step S210).

In Step S210, the processor 41 estimates a remaining time until the second execution method EM2 is completed on the basis of the elapsed time and a ratio of processes completed up to now and performs the determination on the basis of the estimated remaining time. When it is determined in Step S210 that the second execution method EM2 is completed within the second execution time TE2 (Step S210: YES), the processor 41 continues to perform the second execution method EM2 (Step S220) and determines whether the second calculation process CP2 has been completed (Step S230). In the present embodiment, the order of Steps S200 and S210 is an example of the order of the second determination process DP2.

When it is determined in Step S230 that the second calculation process CP2 has not been completed (Step S230: NO), the processor 41 continues to perform the second execution method EM2. When it is determined in Step S230 that the second calculation process CP2 has been completed (Step S230: YES), the processor 41 restarts the first calculation process CP1 (Step S240). When the second execution method EM2 is being performed, the third processing time TC corresponding to the performed alternative process AP is required until the first calculation process CP1 is restarted. The second execution method EM2 is completed by restarting the first calculation process CP1. When the second execution method EM2 is completed, the processor 41 transmits a signal indicating that the second execution method EM2 has been completed to the host device 80. The signal indicating that the second execution method EM2 has been completed includes information indicating that the second calculation process CP2 has been completed.

When the first calculation process CP1 is restarted, the processor 41 calculates the actual processing time APT (Step S250). The processor 41 determines whether the calculated actual processing time APT is longer than the first processing time TA stored in the nonvolatile memory 53 as the processing time of the performed second calculation process CP2 (Step S260). When the actual processing time APT is equal to or shorter than the first processing time TA (Step S260: NO), the processor 41 does not store the actual processing time APT and continues to perform the first calculation process CP1 (Step S330). When the actual processing time APT is longer than the first processing time TA (Step S260: YES), the processor 41 updates the first processing time TA stored in the nonvolatile memory 53 with the actual processing time APT (Step S270). In Step S270, the processor 41 stores a difference time between the first processing time TA and the actual processing time APT before being updated in the nonvolatile memory 53. The processor 41 continues to perform the first calculation process CP1 even when updating of the first processing time TA and storage of the difference time have been performed (Step S330). The processor 41 may perform the processes of Steps S240 to S270 until the first calculation process CP1 is restarted or may perform the processes before a process of restarting the first calculation process CP1 is started.

When it is determined in Step S210 that the second execution method EM2 is not completed within the second execution time TE2 (Step S210: NO), the processor 41 stops the second execution method EM2 and starts the first execution method EM1 (Step S280). In Step S280, the processor 41 restarts the first calculation process CP1 over the third processing time TC corresponding to the second execution method EM2 which is being performed and continues to perform the second calculation process CP2 while performing the first calculation process CP1. In Step S280, the processor 41 transmits a signal indicating that the second execution method EM2 has been stopped and the second calculation process CP2 is not completed within the transmitted time to the host device 80. The processor 41 determines whether the second calculation process CP2 has been completed while performing the first execution method EM1 (Step S290).

When it is determined in Step S290 that the second calculation process CP2 has not been completed (Step S290: NO), the processor 41 continues to perform the first execution method EM1. When it is determined in Step S290 that the second calculation process CP2 has been completed (Step S290: NO), the processor 41 calculates the actual processing time APT (Step S300). In the first execution method EM1, since the first calculation process CP1 and the second calculation process CP2 are simultaneously performed, the second calculation process CP2 is completed, and the process flow of the processor 41 returns to the normal first calculation process CP1.

When the method of performing the second calculation process CP2 is switched from the second execution method EM2 to the first execution method EM1, the processor 41 calculates the actual processing time APT in the following procedure. The processor 41 converts the time in which the second calculation process CP2 is performed in the second execution method EM2 to a time required when the processor 41 performs only the second calculation process CP2. The processor 41 converts the time in which the second calculation process CP2 is performed in the first execution method EM1 to a time required when the processor 41 performs only the second calculation process CP2. The processor 41 calculates the actual processing time APT by summing the converted times of the second calculation processes CP2 performed in the execution methods.

The processor 41 determines whether the calculated actual processing time APT is longer than the first processing time TA stored in the nonvolatile memory 53 as the processing time of the performed second calculation process CP2 (Step S310). When the actual processing time APT is equal to or shorter than the first processing time TA (Step S310: NO), the processor 41 does not store the actual processing time APT and continues to perform the first calculation process CP1 (Step S330). When the actual processing time APT is longer than the first processing time TA (Step S310: YES), the processor 41 updates the first processing time TA stored in the nonvolatile memory 53 with the actual processing time APT (Step S320). In Step S320, the processor 41 stores the difference time between the first processing time TA not updated and the actual processing time APT in the nonvolatile memory 53. The processor 41 continues to perform the first calculation process CP1 after updating of the first processing time TA and storage of the difference time have been performed (Step S330).

Even subsequently to Step S330, the processor 41 normally or periodically performs the determination of Step S120 while performing the first calculation process CP1 and performs the second calculation process CP2 again in the aforementioned order when it is determined that the second calculation process CP2 needs to be performed.

In the present embodiment, in Step S210, it is determined whether the processes of the second execution method EM2 are completed within the second execution time TE2. Accordingly, when the second execution method EM2 is continuously performed after Step S210, there is a high likelihood that the actual processing time APT will be equal to or shorter than the first processing time TA stored in the nonvolatile memory 53. However, by comparing the actual processing time APT with the stored first processing time TA in Step S260, the first processing time TA can be updated when the time required for the second calculation process CP2 increases unexpectedly for a certain reason. When the second execution method EM2 is switched to the first execution method EM1 subsequently to Step S210, there is a high likelihood that the actual processing time APT will be longer than the first processing time TA stored in the nonvolatile memory 53. However, by comparing the actual processing time APT with the first processing time TA in Step S310, the first calculation process CP1 can be continuously performed without performing an unnecessary process when the time required for the second calculation process CP2 decreases unexpectedly for a certain reason.

Figure 14:
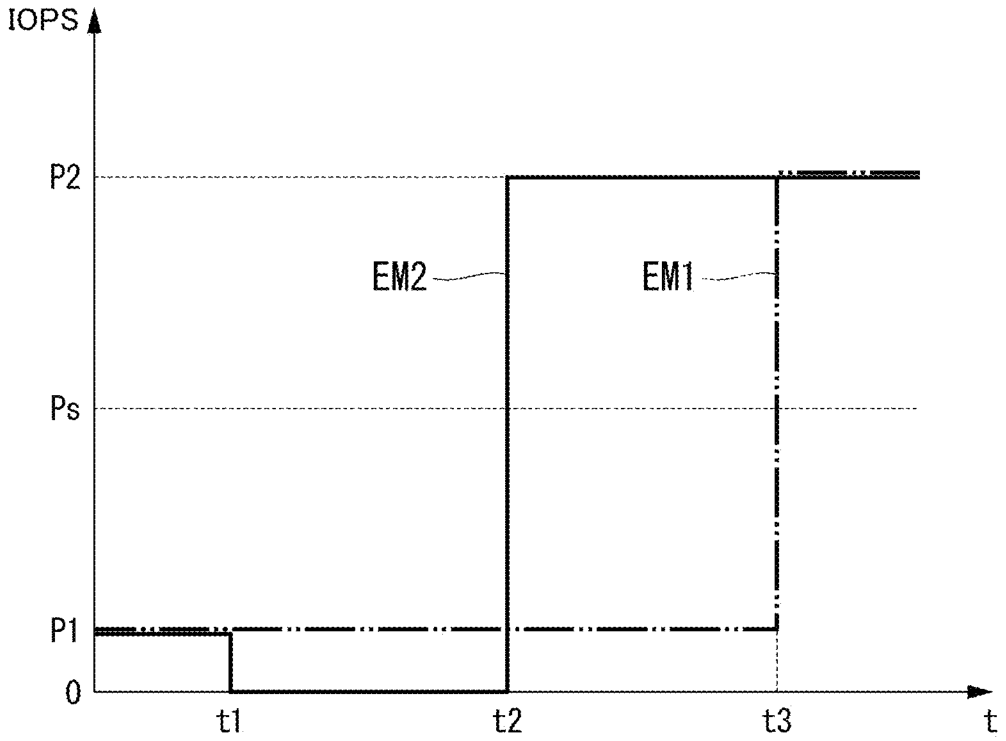
FIG. 14 is a graph illustrating an example of a change in the throughput of the disk drive when a second calculation process is performed according to a first execution method and a second execution method according to the embodiment.

FIG. 14 is a graph illustrating an example of a change in the throughput of the disk drive 100 when a second calculation process CP2 is performed according to the first execution method EM1 and the second execution method EM2. In FIG. 14, the horizontal axis represents the time t, and the vertical axis represents the input/output per second (IOPS) of the disk drive 100. In FIG. 14, a change in the IOPS when the second calculation process CP2 is performed in the first execution method EM1 is indicated by an alternate long and two short dashes line. In FIG. 14, a change in the IOPS when the second calculation process CP2 is performed in the second execution method EM2 is indicated by a solid line. In FIG. 14, an example in which it is determined at time t1 that the IOPS of the disk drive 100 is less than a predetermined threshold value Ps and the second calculation process CP2 is started is illustrated as an example in which the second calculation process CP2 is performed in the second execution method EM2. The second execution time TE2 in the second execution method EM2 illustrated in FIG. 14 is shorter than the first execution time TE1 in the first execution method EM1 illustrated in FIG. 14.

In FIG. 14, the IOPS of the disk drive 100 at time t1 is a value P1 which is less than the threshold value Ps. In the example illustrated in FIG. 14, when the second calculation process CP2 is performed in the first execution method EM1, the second calculation process CP2 is completed at time t3 subsequent to time t1, and the IOPS of the disk drive 100 is a value P2 which is greater than the threshold value Ps. When the second calculation process CP2 is performed in the first execution method EM1, the IOPS of the disk drive 100 is maintained at the value P1 from time t1 to time t3.

In the example illustrated in FIG. 14, when the second calculation process CP2 is performed in the second execution method EM2, writing and reading of data via the head 31 are not possible when the second calculation process CP2 is started, and thus the IOPS of the disk drive 100 at time t1 is zero. In the second execution method EM2, since a calculation load for holding the position θ of the head 31 at a predetermined position is lower than that of the first calculation process CP1, a processing speed of the second calculation process CP2 is higher than that in the first execution method EM1. Accordingly, in the example illustrated in FIG. 14, when the second calculation process CP2 is performed in the second execution method EM2, the second calculation process CP2 is completed at time t2 which is subsequent to time t1 and prior to time t3, and the IOPS of the disk drive 100 becomes a value P2 which is greater than the threshold value Ps. In the example illustrated in FIG. 14, when the second execution method EM2 is performed, the IOPS of the disk drive 100 while performing the second calculation process CP2 is zero, and the IOPS of the disk drive 100 can be improved to the value P2 which is greater than the threshold value Ps earlier than when the first execution method EM1 is performed. When the IOPS of the disk drive 100 is zero, a response from the disk drive 100 to the host device 80 is not transmitted.

A control method according to the present embodiment is the control method that is performed by the control device 40. At least some functions of the control device 40 are realized, for example, by causing the processor 41 to execute a program, that is, software, stored in the disk 20 or the nonvolatile memory 53. The program is a program for causing the control device 40 which is a computer to perform the control method according to the present embodiment. At least some functions of the control device 40 may be realized, for example, by hardware including a circuit unit such as a large scale integration (LSI) circuit, an application-specific integrated circuit (ASIC), a field-programmable gate array (FPGA), and a graphics processing unit (GPU) or may be cooperatively realized by software and hardware. The control device 40 may be constituted by a plurality of devices.

A medium in which the program for causing the control device 40 which is a computer to perform the control method according to the present embodiment is stored is not particularly limited and may be a storage medium other than the disk 20 or the nonvolatile memory 53. The storage medium in which the program is stored may be a storage medium other than a predetermined storage medium in which the first processing time TA, the second processing time TB, the third processing time TC, the first process occupancy ratio k1, and the second process occupancy ratio k2 are stored. The storage medium in which the program is stored may be another storage medium included in the disk drive 100 or may be a storage medium provided separately from the disk drive 100. The storage medium is, for example, a flexible disk, a magneto-optical disc, a random access memory (RAM), a read only memory (ROM), a CD-ROM, a hard disk drive (HDD), a solid state drive (SSD), and a flash memory. The program for causing the control device 40 which is a computer to perform the control method according to the present embodiment may be transmitted to the control device 40 via a telecommunication line. The predetermined storage medium in which the first processing time TA, the second processing time TB, the third processing time TC, the first process occupancy ratio k1, and the second process occupancy ratio k2 are stored may be a storage medium other than the disk 20 and the nonvolatile memory 53. The predetermined storage medium may be a storage medium that is provided outside of the disk drive 100. In this case, the disk drive 100 may communicate with the predetermined storage medium via a telecommunication line and acquire various types of information from the storage medium.

According to the present embodiment, the control device 40 is a control device that controls a disk drive 100. The control device 40 includes the processor 41. The disk drive 100 is configured to perform a first determination process DP1. The processor 41 is configured to perform a first calculation process CP1 which is performed to control a position θ of a head 31 of the disk drive 100. The processor 41 is configured to perform a second calculation process CP2 which is able to be performed at the same time as the first calculation process CP1. The processor 41 is configured to perform an alternative process AP which is performed to hold the position θ of the head 31 at a predetermined position with a calculation load smaller than that of the first calculation process CP1. The first determination process DP1 is a process which is performed on the basis of information stored in the nonvolatile memory 53 (a predetermined storage medium) when it is determined that the second calculation process CP2 is to be performed. The information stored in the nonvolatile memory 53 includes a first processing time TA which is required until the second calculation process CP2 is completed when the processor 41 performs only the second calculation process CP2. The information stored in the nonvolatile memory 53 includes a second processing time TB which is required until the position θ of the head 31 is held at the predetermined position through the alternative process AP instead of the first calculation process CP1. The information stored in the nonvolatile memory 53 includes a third processing time TC which is required to restart the first calculation process CP1 which has been stopped by performing the alternative process AP. The information stored in the nonvolatile memory 53 includes a first process occupancy ratio k1 of the processor 41 which is required to perform the first calculation process CP1. The information stored in the nonvolatile memory 53 includes a second process occupancy ratio k2 of the processor 41 which is required to hold the position θ of the head 31 through the alternative process AP. The first determination process DP1 includes acquiring a first execution time TE1 expressed by $TA/(1-k1)$ and a second execution time TE2 expressed by $\{TA/(1-k2)\}+TB+TC$ on the basis of the information stored in the nonvolatile memory 53. The first determination process DP1 includes selecting a second execution method EM2 different from a first execution method EM1 of performing the second calculation process CP2 while performing the first calculation process CP1 as a method of performing the second calculation process CP2 when the second execution time TE2 is less than the first execution time TE1. The second execution method EM2 is a method of starting the alternative process AP instead of the first calculation process CP1 and then performing the second calculation process CP2.

Accordingly, when the second calculation process CP2 can be earlier completed using the second execution method EM2 than using the first execution method EM1, the control device 40 can select the second execution method EM2 as the method of performing the second calculation process CP2. Accordingly, the control device 40 can complete the second calculation process CP2 earlier by causing the processor 41 to perform the second execution method EM2 than by causing the processor 41 to simultaneously perform the first calculation process CP1 and the second calculation process CP2. As a result, according to the present embodiment, it is possible to curb extending of a time required for the second calculation process CP2 (another calculation process) other than the first calculation process CP1 (a predetermined calculation process). Accordingly, it is possible to shorten the time until the second calculation process CP2 is completed and to rapidly improve the throughput of the disk drive 100.

According to the present embodiment, the first determination process DP1 includes selecting the first execution method EM1 of performing the second calculation process CP2 while performing the first calculation process CP1 as the method of performing the second calculation process CP when the second execution time TE2 is equal to or greater than the first execution time TE1. Accordingly, when the second calculation process CP2 can be earlier completed using the first execution method EM2 than using the second execution method EM2, the control device 40 can select the first execution method EM1 as the method of performing the second calculation process CP2. When the time required until the second calculation process CP2 is completed using the second execution method EM2 is not different from that using the first execution method EM1, the control device 40 can select the first execution method EM1 as the method of performing the second calculation process CP2. Accordingly, by causing the processor 41 to perform the first execution method EM1, the control device 40 can simultaneously perform the first calculation process CP1 and the second calculation process CP2 while curbing extending of the time required for the second calculation process CP2. In this way, the control device 40 according to the present embodiment can select a method with which the second calculation process CP2 can be earlier completed out of the first execution method EM1 and the second execution method EM2.

According to the present embodiment, the disk drive 100 includes the lock mechanism 90 configured to fix the position θ of the head 31 to a position which is separated from a disk 20 of the disk drive 100. The plurality of alternative processes AP include a retreat process AP1 as an alternative process which is performed to fix the position θ of the head 31 using the lock mechanism 90. When the position θ of the head 31 is fixed using the lock mechanism 90, the processor 41 can hold the position θ of the head 31 at the predetermined position without performing any calculation process. Accordingly, in the second execution method EM2 using the retreat process AP1, 100% or almost 100% of the throughput of the processor 41 can be used to perform the second calculation process CP2. As a result, the processor 41 can complete the second calculation process CP2 within a shorter time than that of the first execution method EM1 by performing the second execution method EM2 using the retreat process AP1.

According to the present embodiment, the disk drive 100 includes the head assembly 30 including the head 31. The disk drive 100 includes the stopper 91 that faces the head assembly 30 in the moving direction of the head assembly 30 and is able to come into contact with the head assembly 30 in the moving direction of the head assembly 30. The plurality of alternative processes AP include a pressing process AP2 as the alternative process AP which is performed to control the head assembly 30 such that the head assembly 30 comes into contact with the stopper 91. When the position θ of the head 31 is controlled such that the head assembly 30 comes into contact with the stopper 91, a calculation load of the processor 41 is lower than that when the first calculation process CP1 is normally performed. Accordingly, in the second execution method EM2 using the pressing process AP2, more throughput of the processor 41 can be used to perform the second calculation process CP2. As a result, by performing the second execution method EM2 using the pressing process AP2, the processor 41 can complete the second calculation process CP2 in a shorter time than that of the first execution method EM1. When the head assembly 30 is brought into contact with the stopper 91, an amount of movement of the head assembly 30 is smaller than that when the head 31 is moved to the lock mechanism 90. Accordingly, when the second execution method EM2 using the pressing process AP2 is performed, the second processing time TB and the third processing time TC can be made to shorter than those in the second execution method EM2 using the retreat process AP1.

According to the present embodiment, the plurality of alternative processes AP include the idle operation process AP3 as an alternative process AP which is performed to control the position θ of the head 31 in a sampling period which is longer than that of the first calculation process CP1. In the idle operation process AP3, since the position θ of the head 31 is controlled in a sampling period longer than that of the first calculation process CP1, the calculation load of the processor 41 is lower than that of the first calculation process CP1. Accordingly, in the second execution method EM2 using the idle operation process AP3, more throughput of the processor 41 can be used to perform the second calculation process CP2. As a result, by performing the second execution method EM2 using the idle operation process AP3, the processor 41 can complete the second calculation process CP2 in a shorter time than that of the first execution method EM1. Since the idle operation process AP3 can be performed by shortening the sampling period in the first calculation process CP1, the second processing time TB and the third processing time TC can be made to be shorter than those of the retreat process AP1 and the pressing process AP2.

According to the present embodiment, the first calculation process CP1 includes a plurality of control processes CTP. The plurality of alternative processes AP include the simple control process AP4 as an alternative process AP which is performed to control the position θ of the head 31 without performing at least one of the plurality of control processes CTP. In the simple control process AP4, since at least one control process CTP which is performed in the first calculation process CP1 is not performed, the calculation load of the processor 41 is lower than that of the first calculation process CP1. Accordingly, in the second execution method EM2 using the simple control process AP4, more throughput of the processor 41 can be used to perform the second calculation process CP2. As a result, by performing the second execution method EM2 using the simple control process AP4, the processor 41 can complete the second calculation process CP2 in a shorter time than that of the first execution method EM1. Since the simple control process AP4 can be performed by stopping at least one control process CTP in the first calculation process CP1, the second processing time TB and the third processing time TC can be made to be shorter than those of the retreat process AP1 and the pressing process AP2.

According to the present embodiment, the processor 41 is configured to perform a plurality of alternative processes AP.

The first determination process DP1 includes selecting the second execution method EM2 using an alternative process AP in which the second execution time TE2 is the shortest when at least one of a plurality of second execution times TE2 when the plurality of alternative processes AP are respectively used is less than the first execution time TE1. Accordingly, the processor 41 can employ an execution method in which the processing time of the second calculation process CP2 is the shortest according to the performed second calculation process CP2. Accordingly, it is possible to further curb extending of the time required for the second calculation process CP2. As a result, it is possible to further shorten the time until the second calculation process CP2 is completed and to more rapidly improve the throughput of the disk drive 100. In the present embodiment, the first determination process DP1 includes selecting the first execution method EM1 when all of a plurality of second execution times TE2 when a plurality of alternative processes AP are respectively used are equal to or greater than the first execution time TE1. Accordingly, the control device 40 can select the first execution method EM1 when the time required for the second calculation process CP2 cannot be made to be shorter than that of the first execution method EM1 even using any second execution method EM2. As a result, by causing the processor 41 to perform the first execution method EM1, the control device 40 can curb extending of the time required for the second calculation process CP2 and simultaneously perform the first calculation process CP1 and the second calculation process CP2.

According to the present embodiment, the first determination process DP1 includes transmitting a signal for inquiring about whether to perform the second execution method EM2 to the host device 80, which transmits an instruction to the disk drive 100, when the second execution method EM2 is selected. The first determination process DP1 includes determining whether to perform the second execution method EM2 on the basis of the signal from the host device 80. The processor 41 is configured to perform the second execution method EM2 when it is determined in the first determination process DP1 that the second execution method EM2 is to be performed on the basis of the signal from the host device 80. Accordingly, the processor 41 does not perform the second execution method EM2 when the second execution method EM2 is selected but is not permitted by the host device 80. As a result, it is possible to curb performing of the second execution method EM2 when there is a problem when transmission of a response from the disk drive 100 to the host device 80 is stopped even temporarily. Accordingly, it is possible to curb deterioration of a response time which is not expected by the host device 80. In the present embodiment, the processor 41 is configured to perform the first execution method EM1 when it is determined in the first determination process DP1 that the second execution method EM2 is not to be performed on the basis of the signal from the host device 80. Accordingly, the first execution method EM1 instead of the second execution method EM2 is performed when there is a problem when transmission of a response from the disk drive 100 to the host device 80 is stopped even temporarily. As a result, it is possible to perform the first calculation process CP1 along with the second calculation process CP2 and to curb stopping of transmission of a response from the disk drive 100 to the host device 80.

According to the present embodiment, the signal for inquiring about whether to perform the second execution method EM2 transmitted to the host device 80 includes information on the second execution time TE2. Accordingly, the host device 80 can ascertain a time in which transmission of a response from the disk drive 100 is stopped by performing the second execution method EM2 on the basis of the information on the second execution time TE2. As a result, the host device 80 can more appropriately determine whether the processor 41 is to perform the second execution method EM2 in consideration of a current processing situation of data.

According to the present embodiment, the control device 40 is configured to perform a second determination process DP2 which is performed when the second execution method EM2 is being performed. The second determination process DP2 includes determining whether a time required until the second execution method EM2 is completed is greater than the second execution time TE2 transmitted to the host device 80. The processor 41 is configured to stop the second execution method EM2 when it is determined in the second determination process DP2 that the time required until the second execution method EM2 is completed is greater than the second execution time TE2. Accordingly, when the host device 80 permits performing of the second execution method EM2 and the time required for completion of the second calculation process CP2 is likely to extend more than assumed, the control device 40 can stop the second execution method EM2 and curb occurrence of a trouble in the processes of the host device 80. In the present embodiment, the processor 41 is configured to stop the second execution method EM2 and to perform the first execution method EM1 when it is determined in the second determination process DP2 that the time required until the second execution method EM2 is completed is longer than the second execution time TE2. In the first execution method EM1, since the position of the head 31 is normally controlled, the disk drive 100 can perform writing of data and reading of data on the basis of an instruction from the host device 80. Accordingly, when the second execution method EM2 is stopped and the first execution method EM1 is started, transmission of a response from the disk drive 100 to the host device 80 is recovered. As a result, even when the host device 80 permits performing of the second execution method EM2 and the time required for completion of the second calculation process CP2 is likely to extend more than assumed, it is possible to further curb deterioration of a response time unexpected by the host device 80 by performing the first execution method EM1.

According to the present embodiment, the control device 40 is configured to calculate a time required until the second calculation process CP2 is completed as an actual processing time APT converted to the time required until the second calculation process CP2 is completed when the processor 41 performs only the second calculation process CP2 when the second calculation process CP2 has been completed. The control device 40 is configured to update the first processing time TA stored in the nonvolatile memory 53 with the actual processing time APT when the actual processing time APT is greater than the first processing time TA stored in the nonvolatile memory 53. Accordingly, when a more time than assumed is required until the second calculation process CP2 is completed, the control device 40 can update the first processing time TA on the basis of results. As a result, when the second calculation process CP2 is performed in the next time, the control device 40 can more appropriately select an execution method for the performing the second calculation process CP2. When the second calculation process CP2 is performed in the next time and performing of the second execution method EM2 is selected, the control device 40 can more accurately notify the host device 80 of estimation of the second execution time TE2 required for the second execution method EM2.

According to the present embodiment, the control device 40 is configured to store a difference time between the actual processing time APT and the first processing time TA in the nonvolatile memory 53 when the second calculation process CP2 has been completed and the actual processing time APT is greater than the first processing time TA stored in the nonvolatile memory 53. Accordingly, the control device 40 can more accurately estimate the second execution time TE2 required for the second execution method EM2 on the basis of the stored difference time.

According to the present embodiment, the control device 40 is configured to determine that the second calculation process CP2 is to be performed when the throughput of the disk drive 100 becomes less than a predetermined throughput value. Accordingly, when the throughput of the disk drive 100 decreases, the second calculation process CP2 is performed. As a result, by setting the second calculation process CP2 to, for example, a process which is performed to improve the decreased throughput of the disk drive 100, it is possible to improve the throughput of the disk drive 100 by performing the second calculation process CP2.

According to the present embodiment, the second calculation process CP2 includes a process of generating a digital filter which is used to control the actuator 73 for moving the head 31. Accordingly, it is possible to improve the accuracy of control of the actuator 73 by generating a digital filter through the second calculation process CP2. As a result, it is possible to appropriately improve the throughput of the disk drive 100 by performing the second calculation process CP2.

According to at least one of the aforementioned embodiments, the control device is a control device that controls a disk drive. The control device includes a processor. The control device is configured to perform a first determination process. The processor is configured to perform a first calculation process which is performed to control a position of a head of the disk drive. The processor is configured to perform a second calculation process which is able to be performed at the same time as the first calculation process. The processor is configured to perform an alternative process which is performed to hold the position of the head at a predetermined position with a calculation load smaller than that of the first calculation process. The first determination process is a process which is performed on the basis of information stored in a predetermined storage medium when it is determined that the second calculation process is to be performed. The information stored in the storage medium includes a first processing time which is required until the second calculation process is completed when the processor performs only the second calculation process. The information stored in the storage medium includes a second processing time which is required until the position of the head is held at the predetermined position through the alternative process instead of the first calculation process. The information stored in the storage medium includes a third processing time which is required to restart the first calculation process which has been stopped by performing the alternative process. The information stored in the storage medium includes a first process occupancy ratio of the processor which is required to perform the first calculation process. The information stored in the storage medium includes a second process occupancy ratio of the processor which is required to hold the position of the head through the alternative process. The first determination process includes acquiring a first execution time expressed by TA/(1−k1) and a second execution time expressed by {TA/(1−k2)}+TB+TC on the basis of the information stored in the storage medium where the first processing time is defined as TA, the second processing time is defined as TB, the third processing time is defined as TC, the first process occupancy ratio is defined as k1, and the second process occupancy ratio is defined as k2. The first determination process includes selecting a second execution method different from a first execution method of performing the second calculation process while performing the first calculation process as a method of performing the second calculation process when the second execution time is less than the first execution time. The second execution method is a method of starting the alternative process instead of the first calculation process and then performing the second calculation process. Accordingly, it is possible to curb extending of a time required for the second calculation process (another calculation process) other than the first calculation process (a predetermined calculation process).

In the aforementioned embodiment, an example in which the control device is applied to a disk drive has been described, but the control device according to the embodiment may be applied to a processing device other than a disk drive. The processing device may be a device that performs a predetermined process. The processing device may be any device, for example, as long as it is a device in which a small-sized processor such as a CPU is employed. Examples of the device in which a small-sized processor is employed include an automobile, a mobile phone, a smart watch, a wireless speaker, a noise-cancelling headphone. For example, the processing device may be a semiconductor device or may be a device which is installed in a power plant or the like. A control device that controls the processing device is expressed as follows. The control device includes a processor. The control device is configured to perform a determination process. The processor is configured to perform a first calculation process. The processor is configured to perform a second calculation process which is able to be performed at the same time as the first calculation process. The processor is configured to perform an alternative process which has a calculation load smaller than that of the first calculation process. A control method of controlling the processing device is expressed as follows. The control method includes a first calculation process. The control method includes a second calculation process which is able to be performed at the same time as the first calculation process. The control method includes an alternative process which has a calculation load smaller than that of the first calculation process. The control method includes a determination process which is performed on the basis of information stored in a predetermined storage medium when it is determined that the second calculation process is to be performed. In the control device and the control method for the processing device, the determination process is a process that is performed on the basis of information stored in a predetermined storage medium when it is determined that the second calculation process is to be performed. The information stored in the predetermined storage medium includes a first processing time which is required until the second calculation process is completed when the processor performs only the second calculation process. The information stored in the predetermined storage medium includes a second processing time which is required to perform the alternative process instead of the first calculation process. The information stored in the predetermined storage medium includes a third processing time which is required to restart the first calculation process which has been stopped by performing the alternative process. The information stored in the predetermined storage medium includes a first process occupancy ratio of the processor which is required to perform the first calculation process. The information stored in the predetermined storage medium includes a second process occupancy ratio of the processor which is required to perform the alternative process. The determination process includes acquiring a first execution time expressed by TA/(1−k1) and a second execution time expressed by {TA/(1−k2)}+TB+TC on the basis of the information stored in the storage medium where the first processing time is defined as TA, the second processing time is defined as TB, the third processing time is defined as TC, the first process occupancy ratio is defined as k1, and the second process occupancy ratio is defined as k2. The determination process includes selecting a second execution method different from a first execution method of performing the second calculation process while performing the first calculation process as a method of performing the second calculation process when the second execution time is less than the first execution time. The second execution method is a method of starting the alternative process instead of the first calculation process and then performing the second calculation process. With this control device and this control method, similarly to the aforementioned embodiment, it is possible to curb extending of a time required for the second calculation process (another calculation process) other than the first calculation process (a predetermined calculation process) which is performed by the processing device. With this control device and this control method, the determination process may include selecting a first execution method of performing the second calculation process while performing the first calculation process as the method of performing the second calculation process when the second execution time is equal to or greater than the first execution time.

The determination process may include selecting a third execution method which is different from both the first execution method and the second execution method as the method of performing the second calculation process when the second execution time is equal to or greater than the first execution time. The third execution method may be any method as long as it is different from both the first execution method and the second execution method and it is a method capable of performing the second calculation process. The third execution method may be, for example, a method of performing the second calculation process without performing the first calculation process and the alternative process. The third execution method may be a method of performing the second calculation process while performing a third calculation process different from the first calculation process.

The second calculation process which is able to be performed at the same time as performing the first calculation process may be any process. The number of second calculation processes is not particularly limited as long as it is equal to or greater than one. In the control device and the control method for a disk drive, the alternative process may be any process as long as it is a process which is performed to hold a position of a head at a predetermined position with a calculation load lower than that of the first calculation process. In the control device and the control method for a disk drive, the number of alternative processes is not particularly limited as long as it is equal to or greater than one.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device that controls a disk drive, the control device comprising a processor, the control device being configured to perform a first determination process, wherein the processor is configured to perform a first calculation process which is performed to control a position of a head of the disk drive, a second calculation process which is able to be performed at the same time as the first calculation process, and an alternative process which is performed to hold the position of the head at a predetermined position with a calculation load smaller than that of the first calculation process, wherein the first determination process is a process which is performed on the basis of information stored in a predetermined storage medium when it is determined that the second calculation process is to be performed, wherein the information stored in the storage medium includes a first processing time which is required until the second calculation process is completed when the processor performs only the second calculation process, a second processing time which is required until the position of the head is held at the predetermined position through the alternative process instead of the first calculation process, a third processing time which is required to restart the first calculation process which has been stopped by performing the alternative process, a first process occupancy ratio of the processor which is required to perform the first calculation process, and a second process occupancy ratio of the processor which is required to hold the position of the head through the alternative process, wherein the first determination process includes:

acquiring a first execution time expressed by TA/(1−k1) and a second execution time expressed by {TA/(1−k2)}+TB+TC on the basis of the information stored in the storage medium where the first processing time is defined as TA, the second processing time is defined as TB, the third processing time is defined as TC, the first process occupancy ratio is defined as k1, and the second process occupancy ratio is defined as k2; and selecting a second execution method different from a first execution method of performing the second calculation process while performing the first calculation process as a method of performing the second calculation process when the second execution time is less than the first execution time, and wherein the second execution method is a method of starting the alternative process instead of the first calculation process and then performing the second calculation process.

2. The control device according to claim 1, wherein the first determination process includes selecting the first execution method as the method of performing the second calculation process when the second execution time is equal to or greater than the first execution time.

3. The control device according to claim 1, wherein the disk drive includes a lock mechanism configured to fix the position of the head to a position which is separated from a disk of the disk drive, and wherein the alternative process includes an alternative process which is performed to fix the position of the head using the lock mechanism.

4. The control device according to claim 1, wherein the disk drive includes:

a head assembly including the head; and a stopper that faces the head assembly in a moving direction of the head assembly and is able to come into contact with the head assembly in the moving direction, and wherein the alternative process includes an alternative process which is performed to control the head assembly such that the head assembly comes into contact with the stopper.

5. The control device according to claim 1, wherein the alternative process includes an alternative process which is performed to control the position of the head in a sampling period which is longer than that of the first calculation process.

6. The control device according to claim 1, wherein the first calculation process includes a plurality of control processes, and wherein the alternative process includes an alternative process which is performed to control the position of the head without performing at least one of the plurality of control processes.

7. The control device according to claim 1, wherein the processor is configured to perform a plurality of alternative processes, and wherein the first determination process includes selecting the second execution method using an alternative process in which the second execution time is the shortest when at least one of a plurality of second execution times when the plurality of alternative processes are respectively used is less than the first execution time.

8. The control device according to claim 1, wherein the first determination process includes:

transmitting a signal for inquiring about whether to perform the second execution method to a host device, which transmits an instruction to the disk drive, when the second execution method is selected; and determining whether to perform the second execution method on the basis of the signal from the host device, and wherein the processor is configured to perform the second execution method when it is determined in the first determination process that the second execution method is to be performed on the basis of the signal from the host device.

9. The control device according to claim 8, wherein the signal for inquiring about whether to perform the second execution method includes information on the second execution time.

10. The control device according to claim 9, wherein the control device is configured to perform a second determination process which is performed when the second execution method is being performed, wherein the second determination process includes determining whether a time required until the second execution method is completed is greater than the second execution time transmitted to the host device, and wherein the processor is configured to stop the second execution method when it is determined in the second determination process that the time required until the second execution method is completed is greater than the second execution time.

11. The control device according to claim 1, wherein the control device is configured to calculate a time required until the second calculation process is completed as an actual processing time converted to the time required until the second calculation process is completed when the processor performs only the second calculation process when the second calculation process has been completed and to update the first processing time stored in the storage medium with the actual processing time when the actual processing time is greater than the first processing time stored in the storage medium.

12. The control device according to claim 11, wherein the control device is configured to store a difference time between the actual processing time and the first processing time in the storage medium when the second calculation process has been completed and the actual processing time is greater than the first processing time stored in the storage medium.

13. The control device according to claim 1, wherein the control device is configured to determine that the second calculation process is to be performed when the throughput of the disk drive becomes less than a predetermined throughput value.

14. The control device according to claim 13, wherein the second calculation process includes a process of generating a digital filter which is used to control an actuator for moving the head.

15. A disk drive comprising:

a disk;

a head that is able to read data stored in the disk and to write data to the disk; and a control device including a processor, wherein the control device is configured to perform a first determination process, wherein the processor is configured to perform a first calculation process which is performed to control a position of a head of the disk drive, a second calculation process which is able to be performed at the same time as the first calculation process, and an alternative process which is performed to hold the position of the head at a predetermined position with a calculation load smaller than that of the first calculation process, wherein the first determination process is a process which is performed on the basis of information stored in a predetermined storage medium when it is determined that the second calculation process is to be performed, wherein the information stored in the storage medium includes a first processing time which is required until the second calculation process is completed when the processor performs only the second calculation process, a second processing time which is required until the position of the head is held at the predetermined position through the alternative process instead of the first calculation process, a third processing time which is required to restart the first calculation process which has been stopped by performing the alternative process, a first process occupancy ratio of the processor which is required to perform the first calculation process, and a second process occupancy ratio of the processor which is required to hold the position of the head through the alternative process, wherein the first determination process includes:

acquiring a first execution time expressed by TA/(1−k1) and a second execution time expressed by {TA/

(1−k2)}+TB+TC on the basis of the information stored in the storage medium where the first processing time is defined as TA, the second processing time is defined as TB, the third processing time is defined as TC, the first process occupancy ratio is defined as k1, and the second process occupancy ratio is defined as k2; and selecting a second execution method different from a first execution method of performing the second calculation process while performing the first calculation process as a method of performing the second calculation process when the second execution time is less than the first execution time, and wherein the second execution method is a method of starting the alternative process instead of the first calculation process and then performing the second calculation process.

16. A control method for a disk drive, the control method comprising:

a first calculation process which is performed to control a position of a head of the disk drive;

a second calculation process which is able to be performed at the same time as the first calculation process;

an alternative process which is performed to hold the position of the head at a predetermined position with a calculation load smaller than that of the first calculation process; and a first determination process which is performed on the basis of information stored in a predetermined storage medium when it is determined that the second calculation process is to be performed, wherein the information stored in the storage medium includes a first processing time which is required until the second calculation process is completed when the processor which is able to perform the first calculation process, the second calculation process, and the alternative process performs only the second calculation process, a second processing time which is required to perform the alternative process instead of the first calculation process, a third processing time which is required to restart the first calculation process which has been stopped by performing the alternative process, a first process occupancy ratio of the processor which is required to perform the first calculation process, and a second process occupancy ratio of the processor which is required to hold the position of the head through the alternative process, wherein the first determination process includes:

acquiring a first execution time expressed by TA/(1−k1) and a second execution time expressed by {TA/(1−k2)}+TB+TC on the basis of the information stored in the storage medium where the first processing time is defined as TA, the second processing time is defined as TB, the third processing time is defined as TC, the first process occupancy ratio is defined as k1, and the second process occupancy ratio is defined as k2; and selecting a second execution method different from a first execution method of performing the second calculation process while performing the first calculation process as a method of performing the second calculation process when the second execution time is less than the first execution time, and wherein the second execution method is a method of starting the alternative process instead of the first calculation process and then performing the second calculation process.

17. The control method according to claim 16, wherein the first determination process includes:

transmitting a signal for inquiring about whether to perform the second execution method to a host device, which transmits an instruction to the disk drive, when the second execution method is selected;

determining whether to perform the second execution method on the basis of the signal from the host device; and performing the second execution method when it is determined in the first determination process that the second execution method is to be performed on the basis of the signal from the host device.

* * * * *